(12) United States Patent
Littooy et al.

(10) Patent No.: US 8,200,707 B2
(45) Date of Patent: Jun. 12, 2012

(54) COMPLIANCE MANAGER

(75) Inventors: Hans Littooy, San Diego, CA (US);
Vincent Pugliese, Carlsbad, CA (US);
Michael Emmerson, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 533 days.

(21) Appl. No.: 11/557,943

(22) Filed: Nov. 8, 2006

(65) Prior Publication Data

US 2008/0109128 A1    May 8, 2008

(51) Int. Cl.
*G06F 17/30* (2006.01)
*G06F 12/00* (2006.01)

(52) U.S. Cl. ........................ 707/802; 707/758

(58) Field of Classification Search ............... 707/104.1, 707/802, 758
See application file for complete search history.

(56) References Cited

U.S. PATENT DOCUMENTS

| | | | |
|---|---|---|---|
| 3,829,844 A | 8/1974 | Zonneveld et al. | |
| 3,974,482 A | 8/1976 | Balashov et al. | |
| 4,060,915 A | 12/1977 | Conway | |
| 4,404,639 A | 9/1983 | McGuire et al. | |
| 4,413,314 A | 11/1983 | Slater et al. | |
| 4,420,234 A | 12/1983 | Dolejsi et al. | |
| 4,435,769 A | 3/1984 | Nagano et al. | |
| 4,468,755 A | 8/1984 | Iida | |
| 4,520,399 A | 5/1985 | Iida | |
| 4,538,183 A | 8/1985 | Kanno et al. | |
| 4,558,374 A | 12/1985 | Kurata et al. | |
| 4,667,248 A | 5/1987 | Kanno | |
| 4,691,238 A | 9/1987 | Yamada | |
| 4,725,892 A | 2/1988 | Suzuki et al. | |
| 4,752,908 A | 6/1988 | Bouillot | |
| 4,774,569 A | 9/1988 | Morton et al. | |
| 4,837,635 A | 6/1989 | Santos | |
| 4,891,702 A | 1/1990 | Nakayama et al. | |
| 4,893,258 A | 1/1990 | Sakuragi | |
| 4,899,292 A | 2/1990 | Montagna et al. | |
| 4,972,318 A | 11/1990 | Brown et al. | |

(Continued)

OTHER PUBLICATIONS

"I/M Costs, Benefits, and Impacts", U.S. E.P.A., Nov. 1992.*

(Continued)

*Primary Examiner* — Kuen Lu
(74) *Attorney, Agent, or Firm* — Sheppard Mullin Richter & Hampton LLP

(57) ABSTRACT

An estimate compliance tool to specify estimate compliance criteria is presented. In one embodiment, the tool can be provided using hardware, software or a combination thereof, and can be configured to include functionality to facilitate creation of rules to outline criteria for estimate creation or invoicing. In one embodiment, a user interface is provided to a user to provide the opportunity to enter vehicle and parts identification to which a rule will apply. The user can also be prompted to enter a rule requirement or suggestion such as, for example, the type of parts required. The system can include a first module configured to accept user input specifying vehicle criteria; a second module configured to accept user input specifying parts criteria; and a third module configured to create an estimate compliance rule based on the entered vehicle selection criteria and parts criteria. The system can further include a storage medium configured to store a plurality of created estimate compliance rules and a profile module configured to create a rules profile comprised of a plurality of estimate compliance rules. Additionally, a compatibility module configured to check a plurality of created rules for conflicting rule criteria can be provided.

35 Claims, 25 Drawing Sheets

U.S. PATENT DOCUMENTS

| | | | |
|---|---|---|---|
| 4,992,940 | A | 2/1991 | Dworkin |
| 5,128,859 | A | 7/1992 | Carbone et al. |
| 5,146,404 | A | 9/1992 | Calloway et al. |
| 5,283,865 | A | 2/1994 | Johnson |
| 5,293,309 | A | 3/1994 | Sakai et al. |
| 5,317,503 | A | 5/1994 | Inoue |
| 5,377,098 | A | 12/1994 | Sakai |
| 5,432,904 | A | 7/1995 | Wong |
| 5,504,674 | A | 4/1996 | Chen et al. |
| 5,839,112 | A | 11/1998 | Schreitmueller et al. |
| 5,950,169 | A | 9/1999 | Borghesi et al. |
| 6,049,773 | A | 4/2000 | McCormack et al. |
| 6,185,540 | B1 | 2/2001 | Schreitmueller et al. |
| 6,792,410 | B1 | 9/2004 | Donovan et al. |
| 6,810,383 | B1 | 10/2004 | Loveland |
| 6,810,406 | B2 * | 10/2004 | Schlabach et al. .................... 1/1 |
| 6,950,801 | B2 | 9/2005 | Brookes et al. |
| 7,487,018 | B2 * | 2/2009 | Afshar et al. .................. 701/29 |
| 2002/0065687 | A1 * | 5/2002 | Onoue .............................. 705/4 |
| 2004/0243423 | A1 | 12/2004 | Rix et al. |
| 2005/0044002 | A1 * | 2/2005 | Kwasniewski et al. ......... 705/26 |
| 2005/0131596 | A1 * | 6/2005 | Cherrington et al. ........... 701/29 |
| 2007/0088472 | A1 * | 4/2007 | Ganzhorn et al. .............. 701/33 |

OTHER PUBLICATIONS

NuGen I.T., "Response to CCIF Parts and Material Committee", Enterprise Workflow, NuGen I.T., The internet Integration Company (created Sep. 22, 2006).

CCC information Services, Inc., "Estimate Quality Review" (2001) http://www.ccis.com.

Audatex, a Solera Company, "Audatex Estimate Check™" (2006) Audatex North America http://www.audatex.com.

ADP, ClaimsFlo Passport, Streamline Estimate Review Automatically. (2001) Automatic Data Processing www.adpclaims.com.

CCC Pathways, Estimating Solutions, "Integrated Self Audit" (created Sep. 22, 2006).

* cited by examiner

| Line # | Description | Actual | Guideline | O | N |
|---|---|---|---|---|---|
| 11 | Haz Waste exceeds authorized carrier level | $40.50 | $5.00 | | |
| 9 | Tint Labor should be entered using Body Labor Rate (Rqd) | 0.50 | 0.50 | | |
| 2 | FRT BUMPER COVER - Check Bumper Part Type (Rqd) | NA | NA | | |
| NA | Consider Alternate Parts | 0.0% | 10.0% | | |
| NA | Production Date missing | NA | NA | | |
| NA | Final Estimate missing | NA | NA | | |
| NA | VIN missing | NA | NA | | |
| NA | License missing | NA | NA | | |
| NA | POI missing | NA | NA | | |
| NA | Loss Date missing | $0.00 | NA | | |
| NA | Deductible is 0 | NA | NA | | |
| NA | Loss Type missing | NA | NA | | |
| NA | Federal Tax ID missing | NA | NA | | |
| NA | Bar ID missing | NA | NA | | |

*Fig. 8*

Claim #: 10-23WE255-01
Estimate ID: 11801
Supplement #: Original Estimate
Owner/Insured: Chris Hall
Estimate Commit Date: 1/19/2005 7:37:26 AM Estimate Gross Total: $2,893.04
Profile Name: Insurance West
Profile Version: v-3
Estimating System: Mitchell

212

Estimate Compliance: Failed  214

Non-Compliance Items  216

| Line # | Description | Actual | Guideline |
|---|---|---|---|
| NA | VIN not Found | NA | NA |
| NA | Impact Point not Found | NA | NA |
| NA | Claim Number not Found | NA | NA |
| 2 | Date of Loss not Found | NA | NA |
| 3 | Final Estimate not Found | NA | NA |
| 15 | Glass Rate does not equal Guideline (Rqd) | $45.00 | $36.00 |

Estimator Comment(s):  218

Notes:
Unable to locate appropriate LKQ parts for make/model vehicle
Tax rate changed, effective 11/10 to 8.00%. Please update profile
Due to metallic paint, partial refinish not acceptable repair procedure
Line 2 – This is a note from line 2
Line 4 – This is a note from line 4

Estimate Compliance History:

Revision 3: Failed  217

| Line # | Description | Actual | Guideline |
|---|---|---|---|
| NA | Impact Point not Found | NA | NA |
| 4 | Claim Number not Found | NA | NA |
| 12 | Date of Loss not Found | NA | NA |
| 15 | Glass Rate does not equal Guideline (Rqd) | $45.00 | $36.00 |
| 18 | Mechanical Rate does not equal Guideline (Rqd) | $76.00 | $75.00 |

List of Parts Compliance Rules 460

| Rule 462 | Rule Description 464 | Rule Date |
|---|---|---|
| ☑ LK Parts Only | For parts that LK is recommended, but not AM | 08/23/2005 |
| ☑ OE Parts Required | Required OE Parts | 08/23/2005 |

Add | Edit | Copy | Delete    468

Non-OE Parts Target:
Measures total Non-OE parts usage in the estimate

Year* & Older: 2004 And | Mileage*: 12000 | Target %: 15.00 | Non-Compliance Message: Non-OE Parts utilization below target level of 15% | ☑ Rqd

*Leave blank if applicable to all years or miles

Rqd ☐ Never substitute aftermarket sheetmetal    Rqd = Include in Pass / Fail Criteria

COMPLIANCE MANAGER

TECHNICAL FIELD

The present invention relates generally to auditing and information management systems, and more particularly, some embodiments relate to a systems and methods for implementing the same.

I. DESCRIPTION OF THE RELATED ART

With the advent of high-power, cost effective computing systems came the increased automation of numerous facets of our contemporary society. In the insurance and other casualty and loss industries, for example, computerized claims processing, tracking and payment systems have long been in use to streamline the process and to expedite claims handling and closure.

Insurance and other reimbursement or payment industries often utilize rules that govern the circumstances in which and the amount to which they will reimburse or otherwise fund or pay their respective payees. For example, in the insurance industry, reimbursement amounts, categories of approved replacement parts and the types and quantities of remediation services are often dependent on the type of harm suffered, the particular loss incurred and the type of coverage provided. In many instances, care givers, repair facilities, and other providers are informed of the rules so that the remedial action can be conducted in accordance with the rules. In some instances, a caregiver may call the carrier to determine what activities are covered, or not, based on the carrier requirements. In other instances, an estimate or other proscribed remediation plan may be submitted to the carrier, electronically or manually, and this plan reviewed by the carrier for approval. In some instances, such as in automotive repair, for example, a carrier representative may visit the estimator at the repair facility to review the damage and approve the estimate.

However, because a given remediation location (for example, an auto body shop in the case of automobile insurance, a doctor or hospital in the case of medical insurance, and so on) may work with many different coverage providers and handle numerous different situations, the quantity of and variation among the rules can be daunting. As such, appraisers, care givers, office managers and others in the remediation chain have difficulty knowing and understanding, and hence, complying with, provider rules.

In the automotive repair industry, web-based auditing of estimate data was initiated to address this issue and to provide a more effective tool for screening and approving estimates. In such conventional systems, an estimate was prepared by a repair facility, and transmitted to the carrier or other organization to review the estimate. The estimate was then reviewed and either approved or denied based on the carrier's rules as applied to the given loss. If an estimate was approved the remediation facility was informed and work could proceed. If, on the other hand, the estimate was not approved, reasons for non-approval were communicated back to the shop and the estimate reworked until it was in compliance. This back-and-forth process could be time consuming and logistically difficult. Also, this environment did not lend itself well to accommodating numerous different rules scenarios and accompanying rules sets, nor did it lend itself to the ability to update existing rules or to implement new rules.

II. BRIEF SUMMARY OF EMBODIMENTS OF THE INVENTION

According to various embodiments of the invention an estimate and invoicing compliance tool to specify compliance criteria is presented. In one embodiment, the tool can be provided using hardware, software or a combination thereof, and can be configured to include functionality to facilitate creation of rules to outline criteria for estimate creation or invoicing. In one embodiment, a rules creation module is provided to allow a user to generate rules. The rules creation module can include a user interface to provide the opportunity to enter vehicle and parts identification to which a rule will apply to a rule being created. The user can also be prompted to enter a rule requirement or suggestion such as, for example, the type of parts required.

In one embodiment, the system can include a first module configured to accept user input specifying vehicle criteria; a second module configured to accept user input specifying parts criteria; and a third module configured to create an estimate compliance rule based on the entered vehicle selection criteria and parts criteria. The system can further include a storage medium configured to store a plurality of created estimate compliance rules and a profile module configured to create a rules profile comprised of a set of one or more estimate compliance rules. Additionally, a compatibility module configured to check a plurality of created rules for conflicting rule criteria can also be provided.

The system can further include a communication module configured to provide the created estimate compliance rule to an estimator for use in checking his or her estimates or invoices for compliance therewith. The system can be configured to accept various vehicle criteria, including for example, a vehicle year or range of years, vehicle mileage or range of mileage, and other vehicle criteria such as, for example, a vehicle class, vehicle type, vehicle make/model, or vehicle duty. Similarly, the system can be configured to accept various parts criteria identifying parts, components, assemblies, subassemblies or categories of parts for which the rule can apply, and parts types (e.g., original equipment, LKQ, used, etc.) required. Modules to accept Boolean operators can also be included.

Features and aspects of the invention can be provided in hardware, software and combinations thereof. Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

III. BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 8 is a diagram illustrating an example pop-up window that can be provided to the appraiser by an estimate generation module in accordance with one embodiment of the invention.

FIG. 10 is a diagram illustrating an example of a compliance results report in accordance with one embodiment of the invention.

FIG. 11 is a diagram illustrating an example user interface that can be implemented to facilitate rule creation in accordance with one embodiment of the invention.

FIG. 12 is a diagram illustrating an example user interface that can be implemented to facilitate rule creation in accordance with one embodiment of the invention with example vehicle criteria added.

Figure 15:
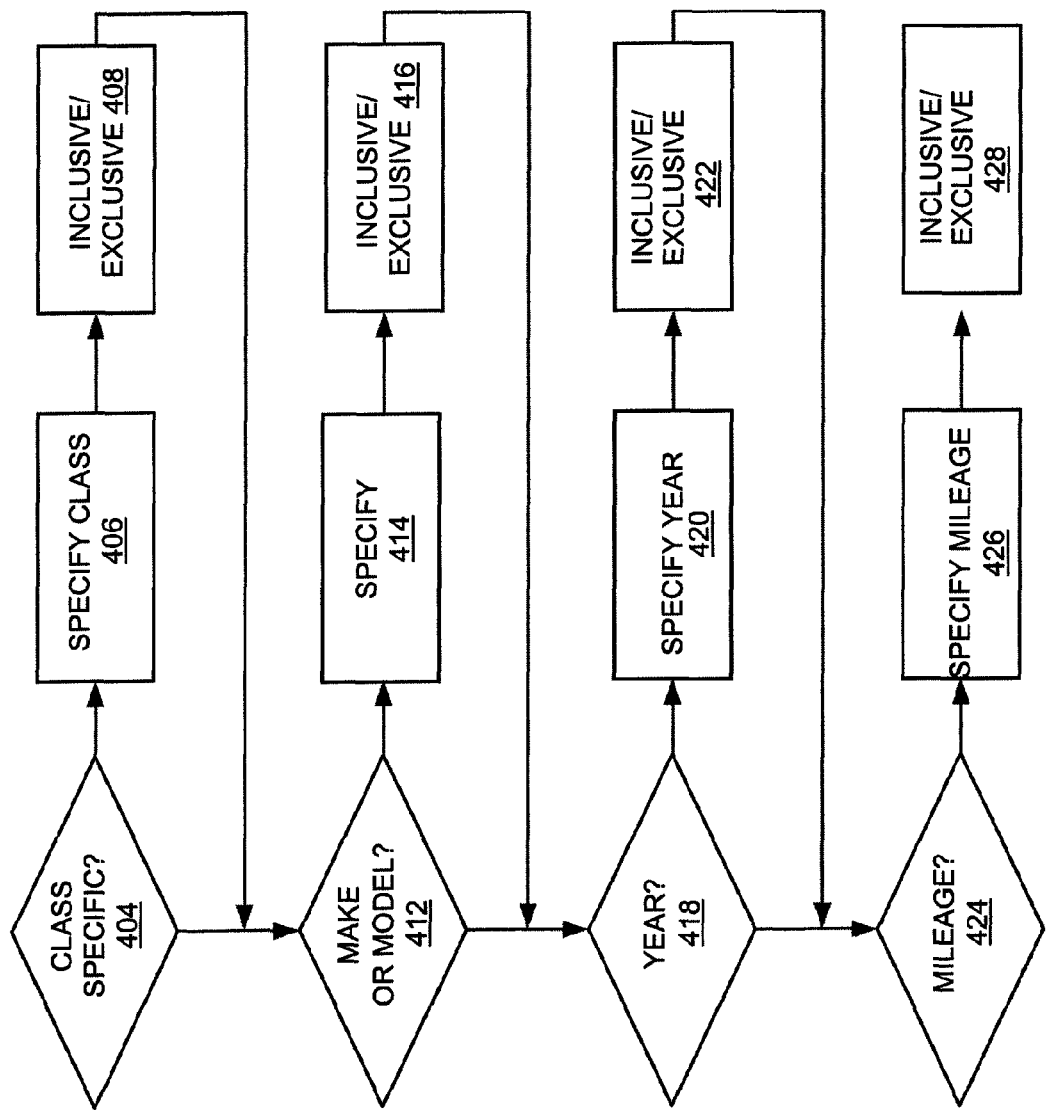

FIG. 15 provides an operational flow diagram for an example process of vehicle criteria selection in accordance with one embodiment of the invention.

Figure 16:
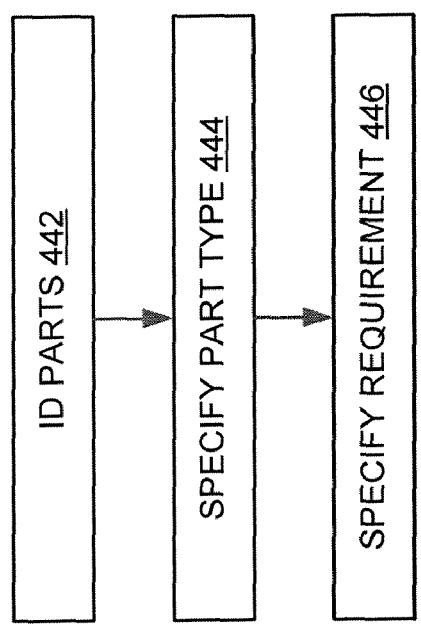

FIG. 16 is a diagram illustrating an example process for parts criteria selection in accordance with one embodiment of the invention.

FIG. 17 is a diagram illustrating an example user interface for displaying a list of created parts compliance rules in accordance with one embodiment on the invention.

Figure 18:
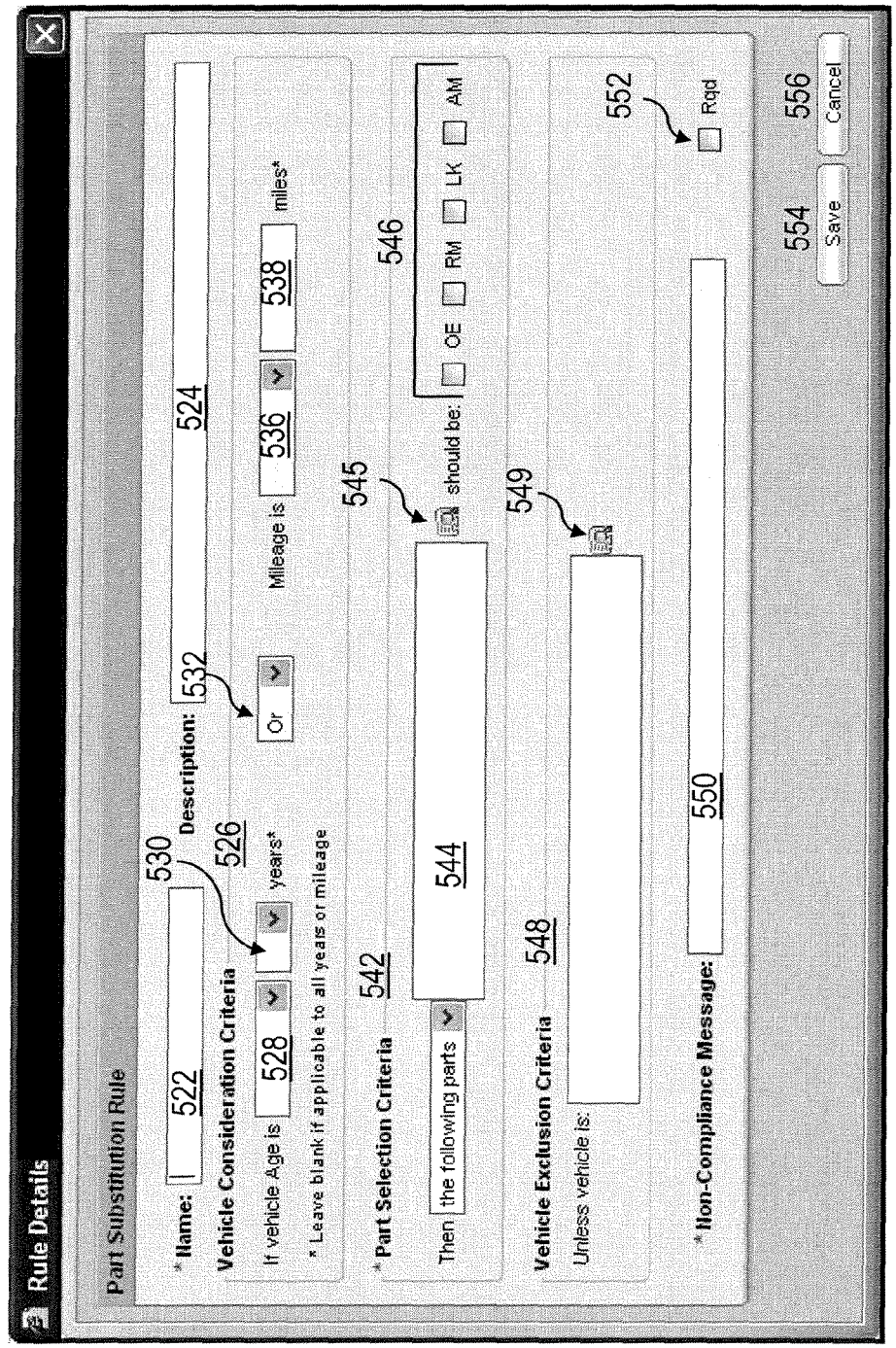

FIG. 18 is a diagram illustrating another example user interface that can be implemented to facilitate rule creation in accordance with one embodiment of the invention.

Figure 19:
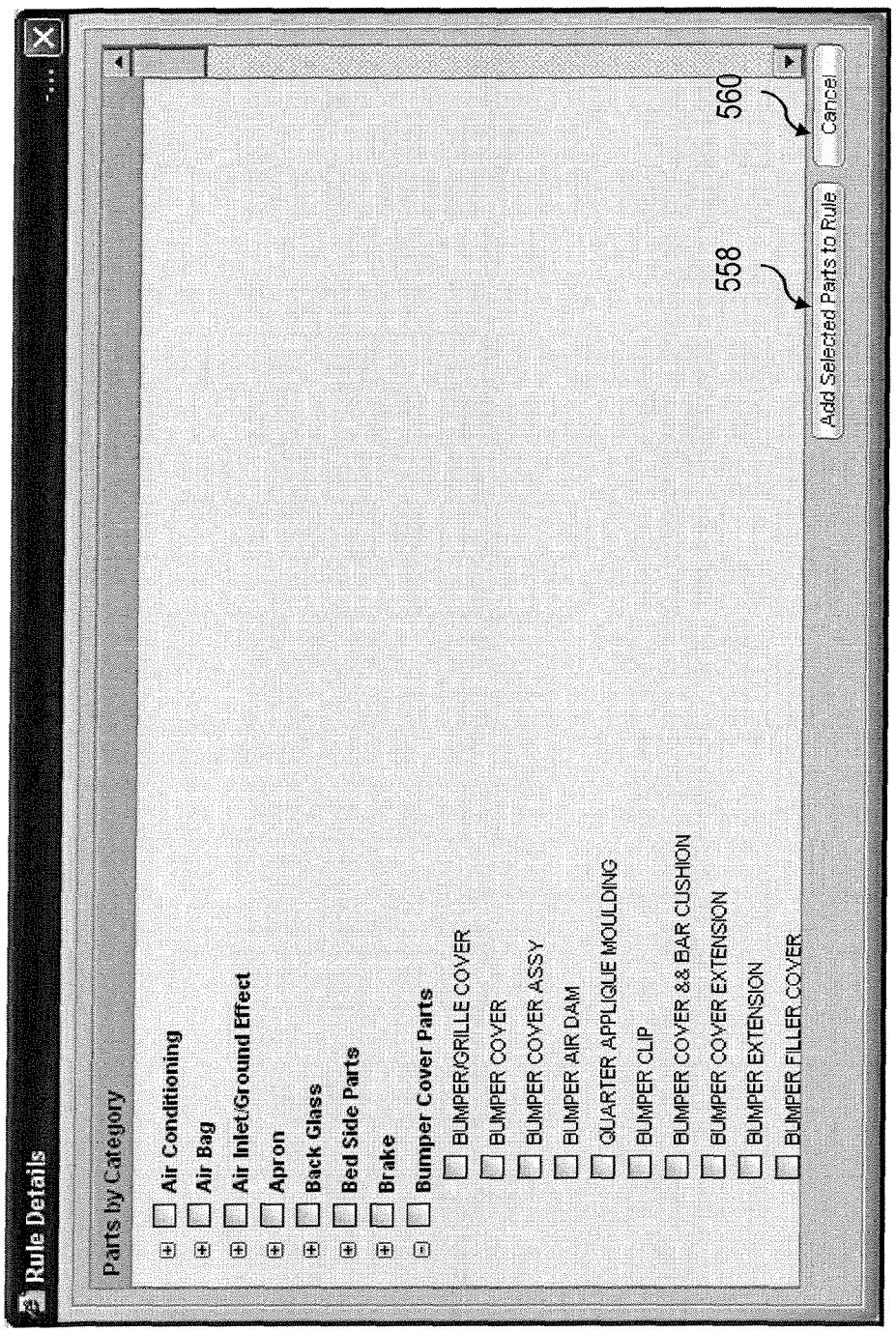

FIG. 19 is a diagram illustrating an example user interface that can be implemented to facilitate parts identification in accordance with one embodiment of the invention.

Figure 20:
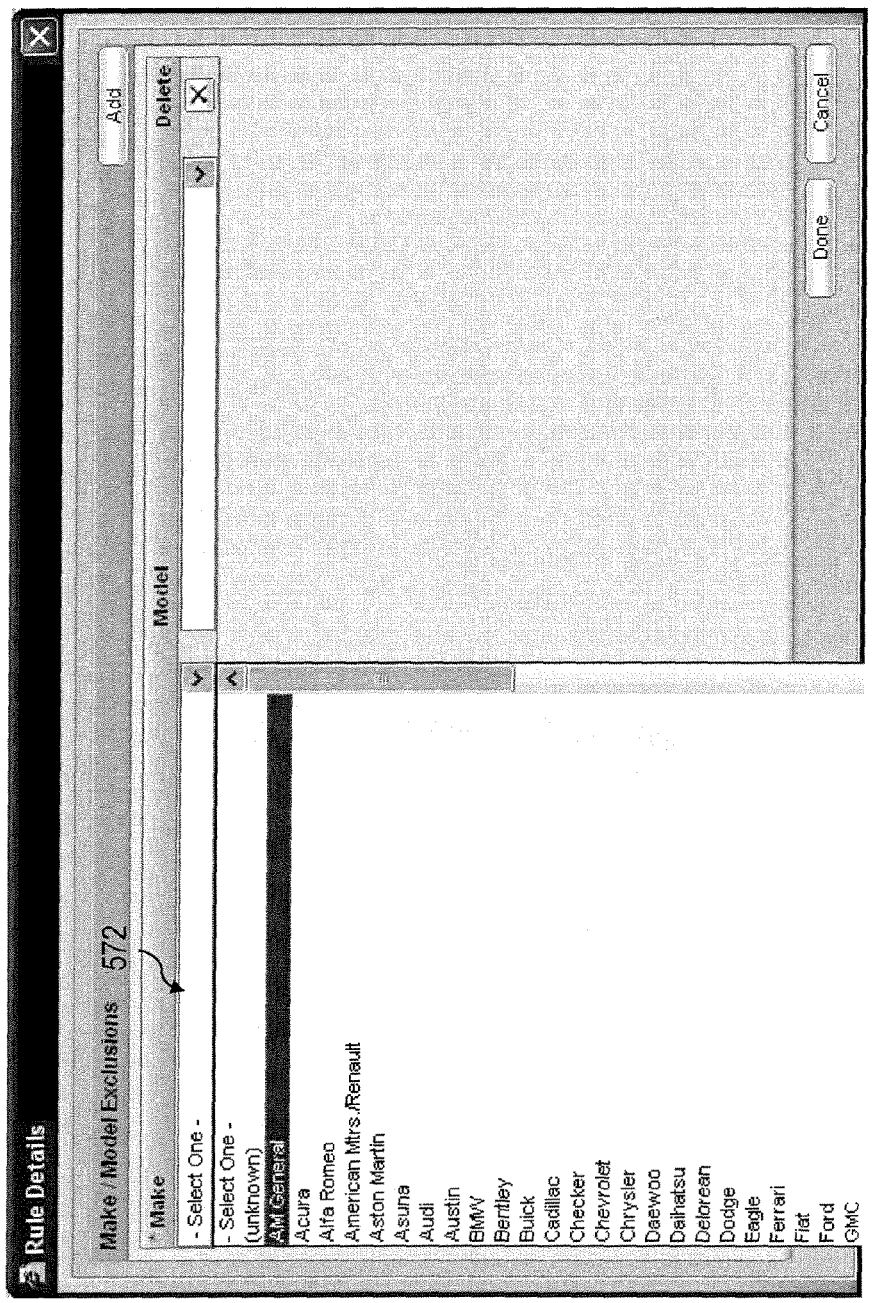

FIG. 20 is a diagram illustrating an example user interface that could be implemented to facilitate make and model identification in accordance with one embodiment of the invention.

Figure 21:
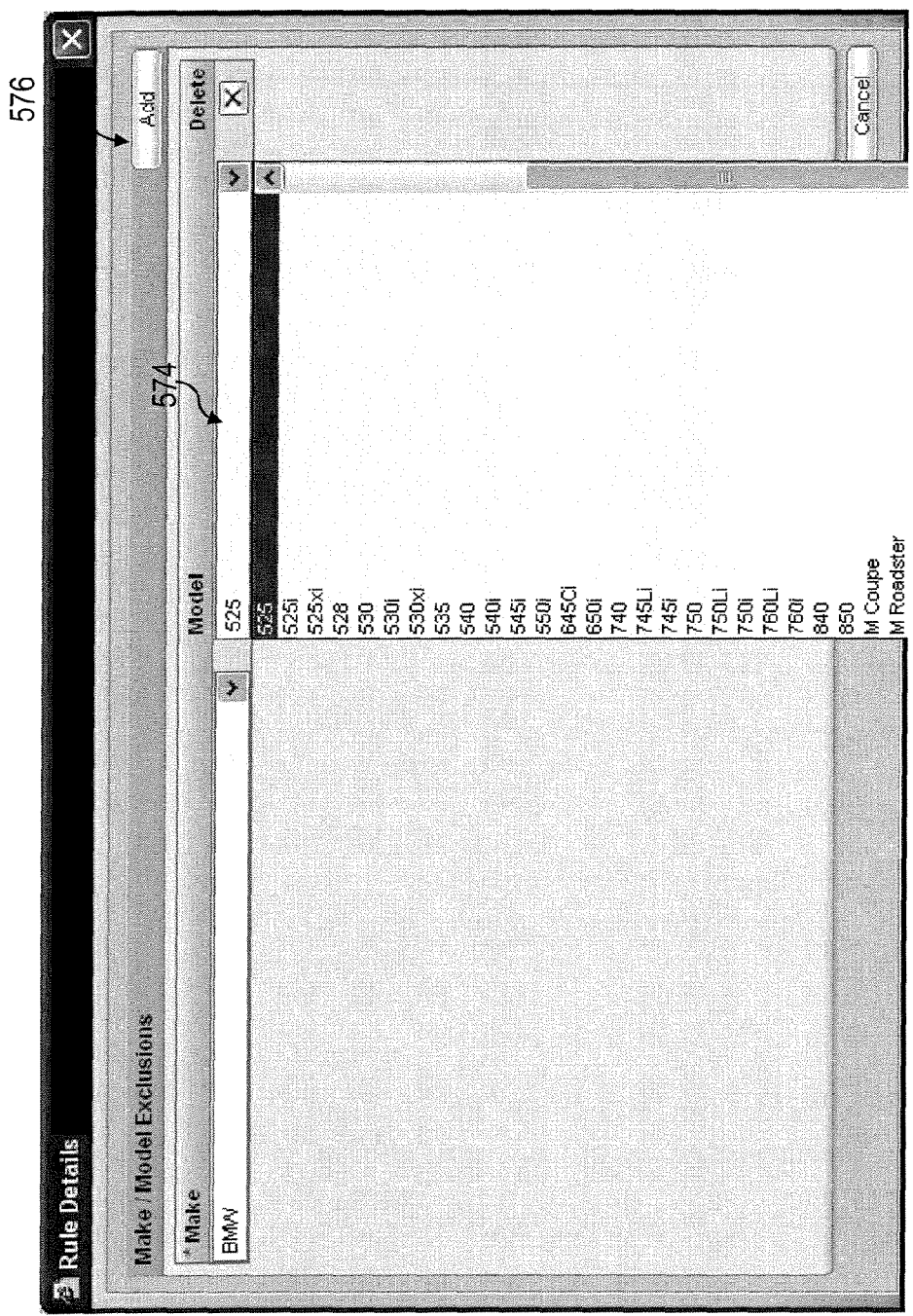

FIG. 21 is a diagram illustrating the user interface of FIG. 20, and further illustrating an example where a make has been identified and model selection(s) can be made based on that make, in accordance with one embodiment of the invention.

Figure 22:
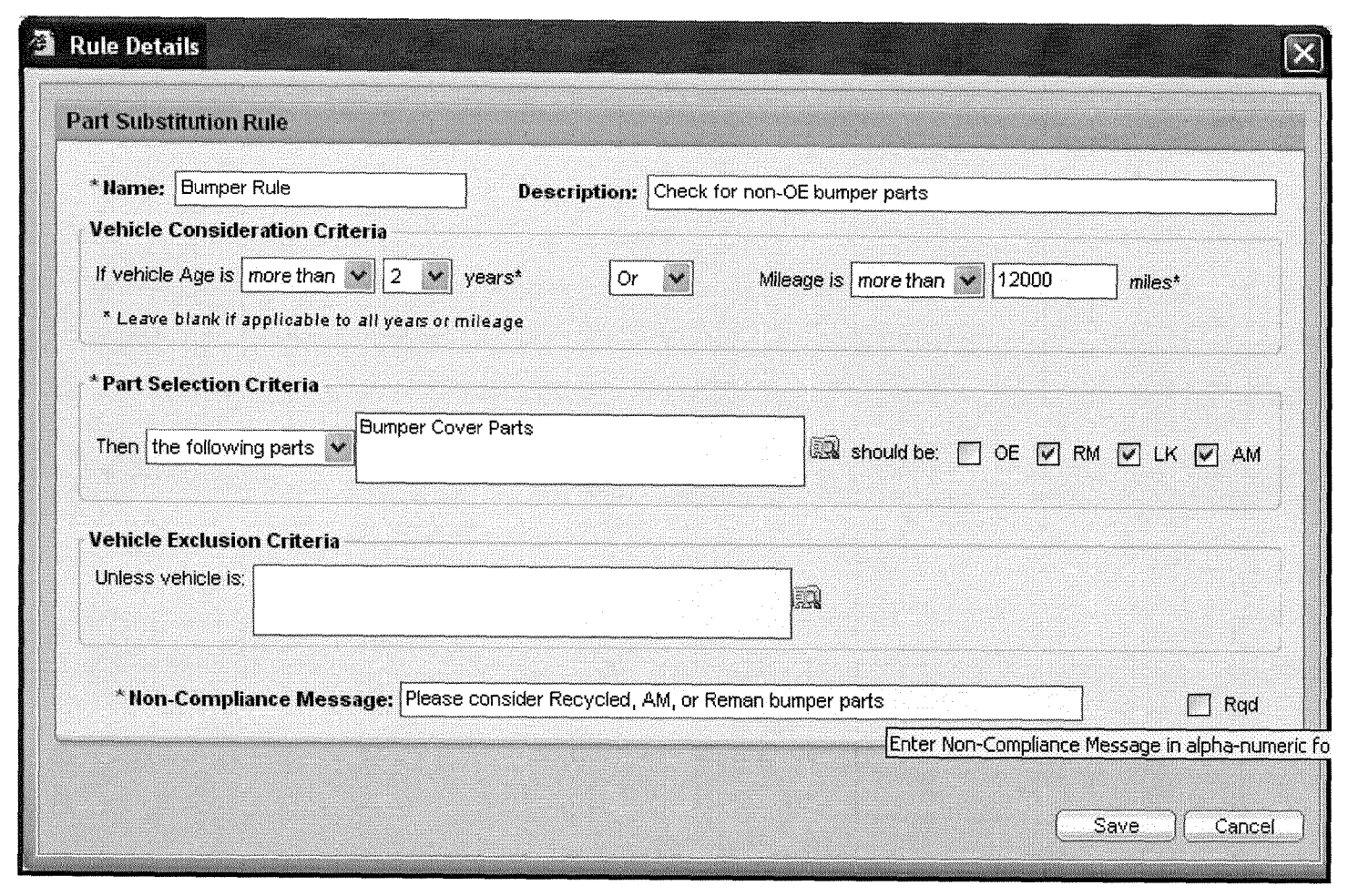

FIG. 22 is a diagram illustrating the example rules creation interface of FIG. 18 with sample criteria illustrated as an example in accordance with one embodiment of the invention.

Figure 23:
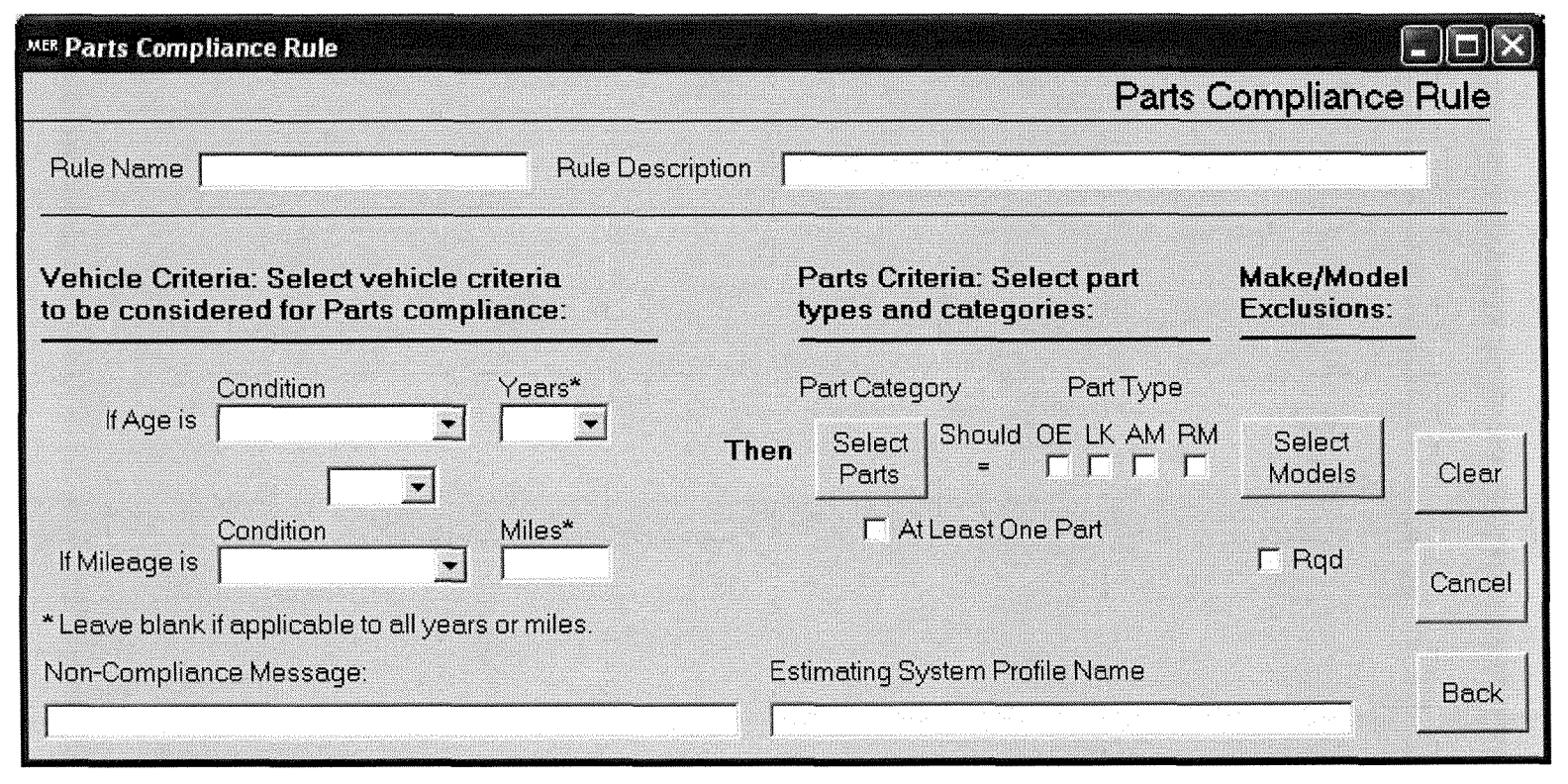

FIG. 23 provides yet another example of a rules creation interface in accordance with one embodiment of the invention.

Figure 24:
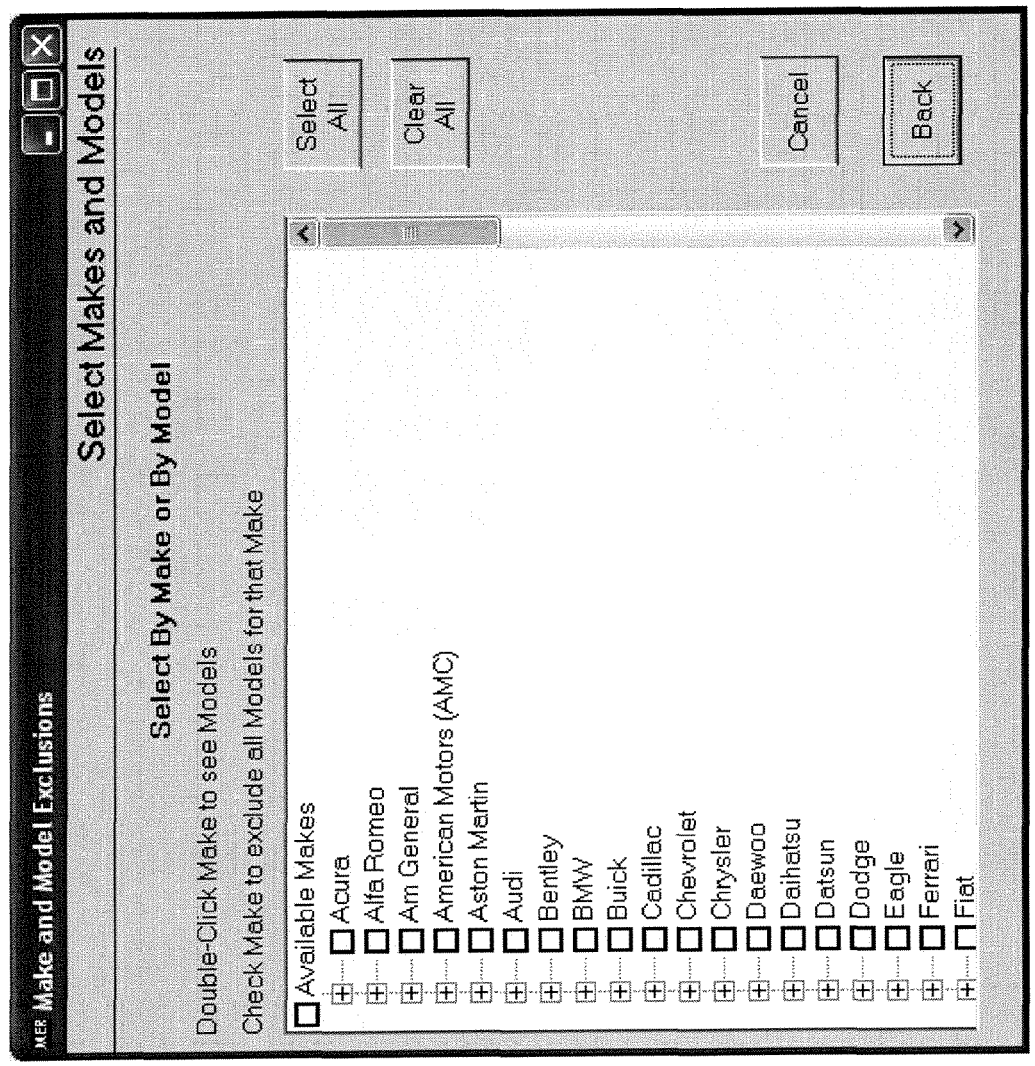

FIG. 24 is a diagram illustrating another example interface for make and model selection in accordance with one embodiment of the invention.

Figure 25:
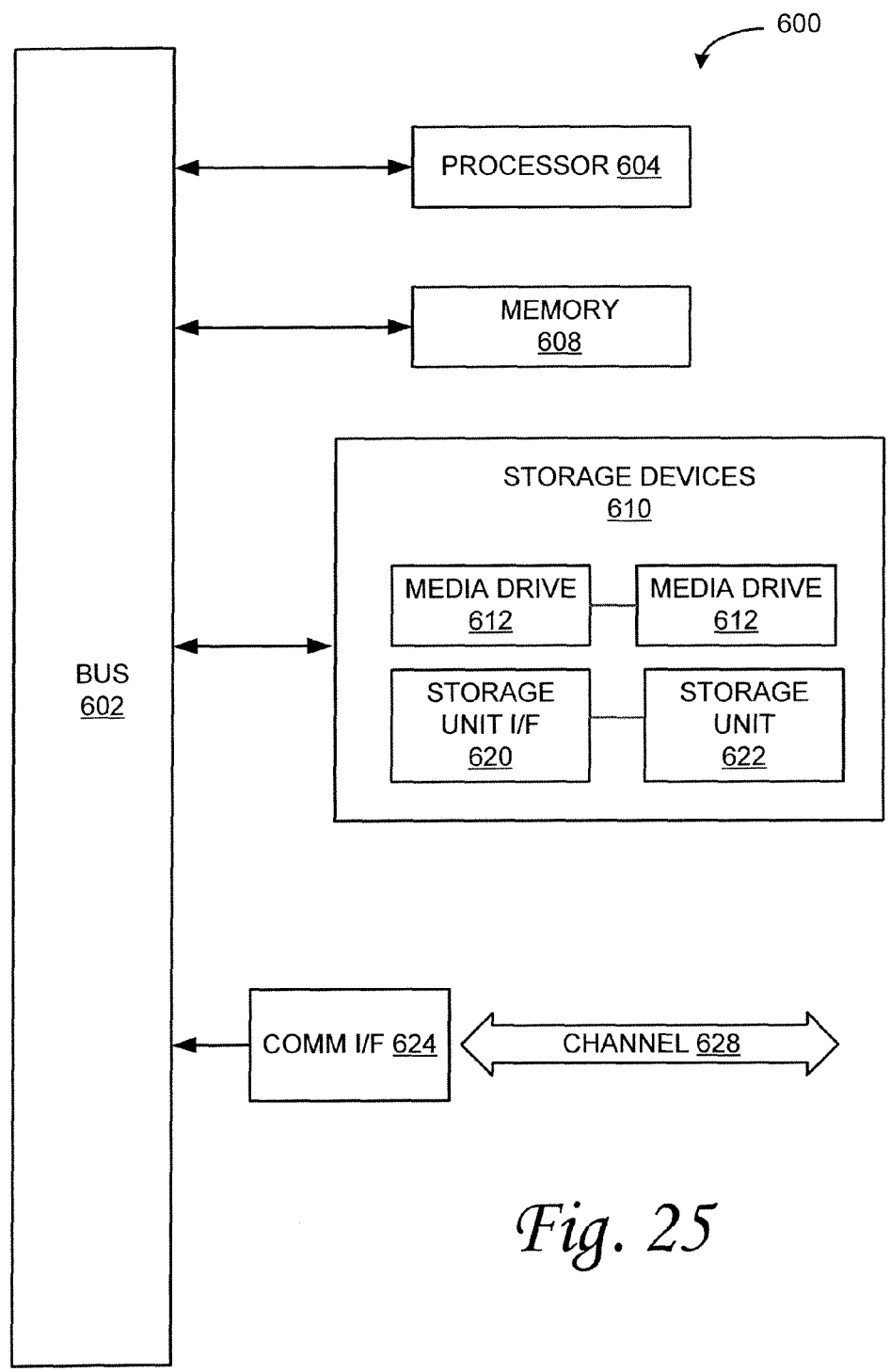

FIG. 25 is a diagram illustrating an example computing system with which various components of the invention can be implemented in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

IV. DETAILED DESCRIPTION OF THE EMBODIMENTS OF THE INVENTION

The present invention is directed toward a system and method for providing a system, appliance, application or other tool for remedial activity management. In one embodiment, the invention can be implemented to provide such features as rules creation, rules implementation and management, remediation plan review and approval, activity tracking, and reporting and analysis. As used herein, the phrase remedial activity is broadly defined to encompass any of a number of various activities including, for example, reparative, replacement, alleviation, antidotal, corrective, curative, health-giving, invigorating, medicating, treatment, recuperative, restitutive, restorative, and other activities. The phrase can apply to mandatory or compulsory activities, processes and procedures as well as optional, elective or voluntary activities, processes and procedures.

Figure 1:
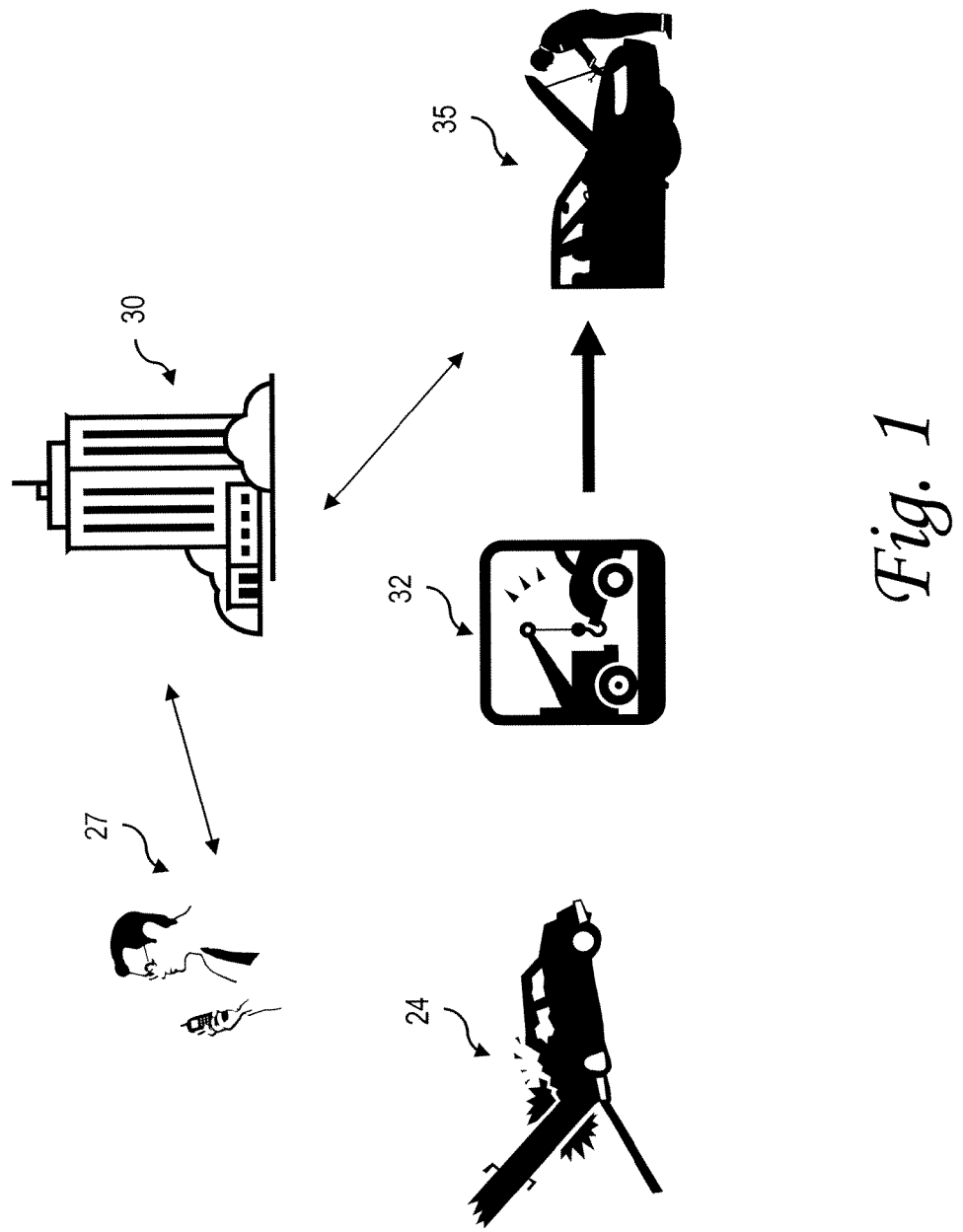
FIG. 1 is a diagram illustrating an example environment in accordance with one embodiment of the invention.

Before describing the invention in detail, it is useful to describe an example environment with which the invention can be implemented. One such example is that of automotive repairs that are covered, at least in part, by a third-party provider or other payor such as, for example, an insurance carrier. FIG. 1 is a diagram illustrating this example environment in accordance with one embodiment of the invention. Referring now to FIG. 1, in this example environment, an insured automobile owner or driver carries insurance coverage to compensate him or her for losses suffered as a result of incidents such as accidents, floods, fires, acts of vandalism and so on. The insured party may be an individual owner or driver or may be a company (for example, an employer of the driver) or other entity.

In an example scenario in this environment, the insured's vehicle is damaged in an accident as illustrated by icon 24. The insured (icon 27) informs his or her insurance carrier (icon 30) of the accident and requests coverage for the remediation activities, which in this case is repair of the damaged vehicle. As illustrated by icon 32, a towing facility is dispatched to take the vehicle to a repair facility 35.

In the example environment, before repairs are undertaken, the insurance carrier may require that an estimate be provided and that all repairs and parts be made in accordance with carrier rules, and that they be approved in advance. The carrier may also require appraiser review from a carrier representative. For example, carrier rules may specify they types of parts that can be used (for example, Original Equipment (OE), Like Kind and Quality (LKQ), Used, Remanufactured, and so on). The part types may vary based on vehicle make and model, model year, mileage, vehicle class, part number, part use, policy limits and so on. The rules may also specify other parameters such as, for example, labor rates, labor maximums, part-type ratios, interim inspections, allowable substitutions, and so on. Once the estimate is prepared, it can be submitted to the carrier and audited. The audit may lead to approval of the specified remedial activities or may result in disapproval of the estimate or one or more line items thereof. When repairs on the vehicle are completed, the final bill can be submitted to the carrier and again audited for conformance.

From time to time, the present invention is described herein in terms of this example environment. Description in terms of this example environment is provided to allow the various features and embodiments of the invention to be portrayed in the context of an exemplary application. After reading this description, it will become apparent to one of ordinary skill in the art how the invention can be implemented in different and alternative environments, and how the invention can be implemented for various remedial and other activities.

Figure 2:
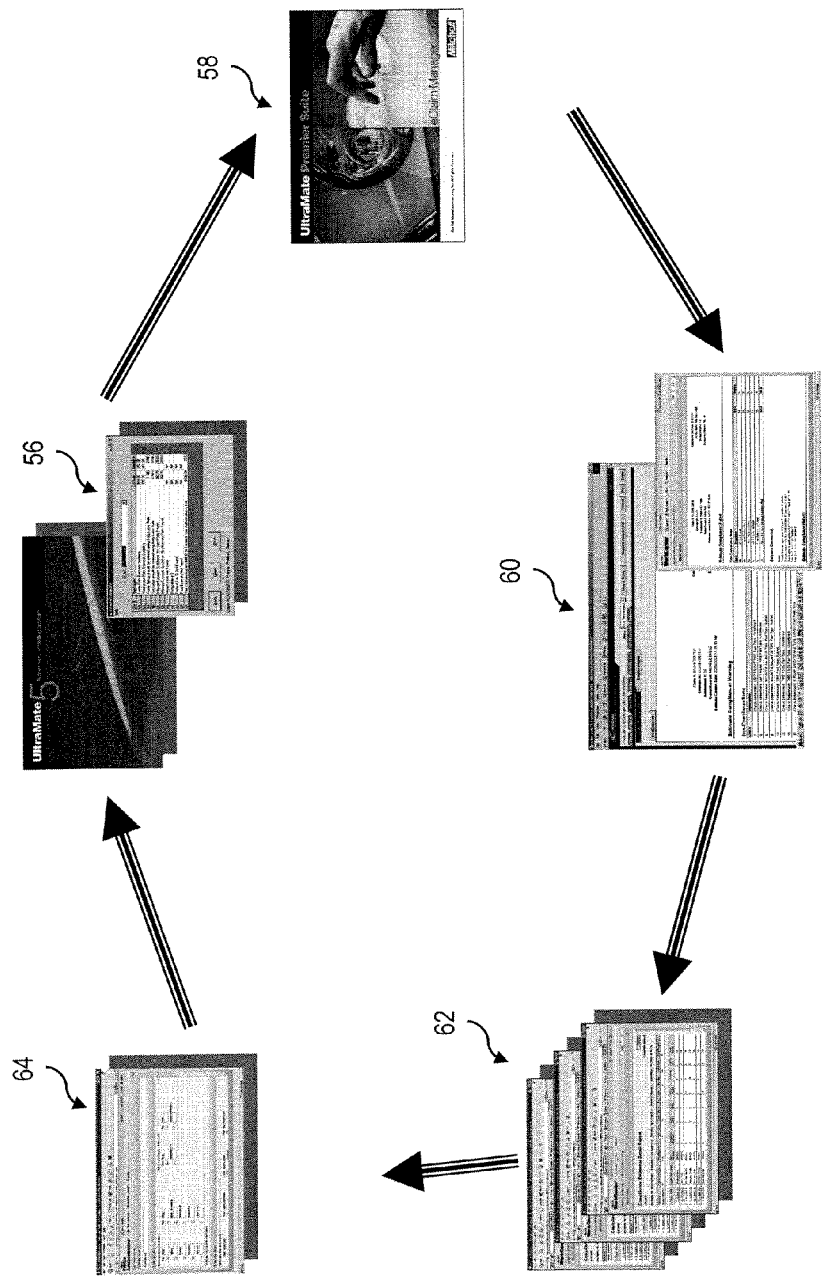
FIG. 2 is a diagram illustrating an overall process for remedial activity and management in accordance with one embodiment of the invention.

FIG. 2 is a diagram illustrating an overall process for remedial activity and management in accordance with one embodiment of the invention. Referring now to FIG. 2, this embodiment is described beginning with the process of estimate creation and compliance checking. As illustrated by icon 56, the vehicle or other remediation subject is examined to determine the extent of damage or to otherwise determine the level and amount of remedial activity desired or required. In terms of the example environment, this step can be performed by a number of different personnel including, for example, a body shop estimator, claims adjuster, an independent appraiser, or other appraiser. In other environments, a nurse, doctor, or other health care worker (in the health care environment, for example) may conduct the initial examination and prescribe a course of remedial action to treat or cure the patient.

In one embodiment, this estimating process can be performed utilizing any of a variety of computing devices such as, for example, computers, laptops, PDAs, smartphones, and other stationary or portable computing devices. These devices can include various user interfaces to allow data entry, viewing of entered data, and printing of reports and other information. In addition to data entry by user interfaces, the computing devices can support additional forms of data entry including, for example, bar code readers, RFID readers, near-field communication readers, data ports and other data interfaces. As would be apparent to one of ordinary skill in the art after reading this description, any of a variety of peripheral devices, user interfaces, features, software applications or modules, or other options and enhancements, whether now or later developed, can be included with the computing device used for the estimating.

Also occurring in Step 56 is the step of compliance checking. In this step, the entered estimate is compared against a set of one or more rules to determine whether the estimate is in compliance with those rules. As discussed above in terms of the example environment, the rules can include, for example, rules delineating part types, labor thresholds, levels of inspection, suppliers and so on. The rules in one embodiment can vary from customer to customer, shop to shop, and carrier to carrier, and can vary based on the incident type, the subject of the remedial activity and so on.

In one embodiment, a rules profile, or set of one or more rules, can be defined for various entities. For example, certain shops may receive certain profiles, different regions may have different labor rates, and so on. Therefore, in one embodiment a rules library or grouping of various rules can be maintained, and rules selected from the library to create various rules profiles to be distributed as deemed appropriate. The rules library can be used to select rules for profiles, copy and edit existing rules to create new rules and so on. Rules stored in the rules library can be categorized using various parameters or criteria such that they can be sorted, searched, and browsed to facilitate identification of desired rules for inclusion in a given profile. Profiles can be saved and stored and can also be updated from time to time. Profiles can be identified for applicability to various estimators, shops or other entities.

In one embodiment, a profile of one or more rules can be distributed to the estimator so that the estimator can maintain the rule at a computing device to allow local compliance checking of an estimate before it is sent off to a carrier or other third party for compliance review. If desired, an updated profile can be created and distributed to the estimator as well.

In one embodiment, with a profile, rule or set of rules installed at an estimator location, real time or near real time compliance checking can be implemented to allow the estimator to review and correct his or her estimate in accordance with a pre-determined rule set or profile of one or more rules before the estimate is provided to a carrier. This can provide a benefit of saving time and communication bandwidth in the compliance review process. This can also allow for a smoother working interface between the estimator and the carrier or other third party provider.

In another embodiment, compliance checking can be performed by the carrier or other third party or by another third party service remote from the estimator location. In this embodiment, the completed or partially-completed estimate can be uploaded to the utility at the carrier location to perform the compliance check and to report back to the estimator items that are out of compliance, if any. A hybrid approach can also be implemented wherein local rules checking or compliance checking is performed by the estimator locally and the estimate is further checked at the carrier as a redundancy check or to compliance check the estimate against the latest version of the rules that may be in place at the carrier.

In Block 58, the completed estimate is uploaded to the carrier. In embodiments where the estimate is checked for compliance locally by the estimator, the information communicated to the carrier can also include information regarding the results of the compliance check. For example, where the compliance check was completed and the estimate successfully validated, information indicating the same can be provided to the carrier such that an auditor or other carrier personnel will know that the estimate was checked and that it is in compliance with the rules in place.

In one embodiment, additional information can be included such as the version of the rule set in place that the estimator had used to perform the compliance check as well as summary information such as the rule set used, incident type and other like information that would be useful to provide an auditor with at-a-glance information as to the estimate and compliance checking process. The information uploaded can also include, where available, information such as a claim number, a claimant number, carrier identification, body shop identification, estimator identification, claimant and body shop contact information, and other information that may be useful, provided or available during the estimation and repair process.

In one embodiment, a flag can be set or other data provided to indicate the compliance check was successful such that an automated process at the carrier detects this flag or other data to confirm compliance before providing the estimate to an auditor for review and inspection. Appropriate software or other control logic can be resident on the carrier's server system to respond to the estimator when an estimate is received that is out of compliance. In one embodiment, the carrier system can identify the areas of noncompliance and provide specific information back to the estimator regarding why the estimate is not in compliance and in some instances how to correct the noncompliance.

In another embodiment, the system can simply reject or disallow the estimate leaving it to the estimator or the local rules engine at the estimator's location to determine the reason for the noncompliance. In one embodiment, it is preferred that the local rules at the estimator's location perform a complete compliance check and ensure full compliance with the local rules set prior to transmitting the estimate to the carrier location. In one embodiment, the system can be configured to inhibit transmission of an estimate until the compliance check is completed locally to avoid unnecessary communications and iterations.

As described more fully below, the local rules can be configured to provide explanation or analysis as to areas of noncompliance to enable the estimator to rework the estimate to be in compliance with the rules. Additionally, help lines, interactive chat sessions and other techniques can be implemented and provided to lend real time or near real time assistance to an estimator to bring the estimate into compliance. In another embodiment, where an exception to a compliance rule is provided, the application can allow the estimator to enter a notation that a line item or various items are out of compliance, and to enter a reason for the non-compliance. In one embodiment, the system can be configured to allow exceptions for certain rules (or any or all of the rules), and can also be configured to track levels of non-compliance.

In block 60, the estimate can be provided to an auditor or other like personnel to review and audit the estimate. In this step, the auditor can manually review the estimate as a double check to confirm that it is, in fact, in compliance. Where exceptions are sought, the indicated reasons for such exceptions can also be reviewed to allow the auditor to allow or disallow the estimate with the exceptions.

Although not discussed above, the final invoice for parts and services rendered can also be submitted to the carrier in the same manner as estimates. The invoice can also be checked locally or at the carrier for compliance with the applicable rules and any exceptions granted during the estimation process. As such, in block 60 the auditor can also perform the function of reviewing final invoices for compliance and authorizing payment to the repair facility where appropriate. Additionally, an auditor or appraiser can conduct an independent inspection of the vehicle before any work is performed as a further step in checking for compliance with the rules and ensuring appropriateness of the estimate. Such a physical inspection or re-inspection can also occur prior to final payment to verify that the work was done in accordance with the estimate and proper business standards.

Information throughout the process can be gathered and maintained for various purposes including recordkeeping and reporting purposes, statistical analysis, auditing, and other purposes. For example, the system can be configured to provide reports on compliance and noncompliance for one or more vendors, vendor estimating accuracy, and so on. Additionally, the data can be reviewed and analyzed to identify areas for improvement in rule sets used for various scenarios and developing new rule sets as the industries evolve. Thus, in Block 64, profiles and rules can be modified and created and new rule sets provided to estimators for use in estimating operations.

Guidelines, rules, and other information provided to estimators can be communicated or distributed in a variety of ways using various communication technologies. For example, web-based applications can be used to distribute rules and other information to estimators as well as to transmit estimates from the estimators to the carrier and to perform other communication throughout the process. Of course, as will be apparent to one of ordinary skill in the art after reading this description, the communications are not limited to web-based communications and any variety of communication, whether via direct link, WAN, LAN, MAN or other communication medium, can be implemented as may be appropriate considering cost, speed, bandwidth, security, or other considerations.

Figure 3:
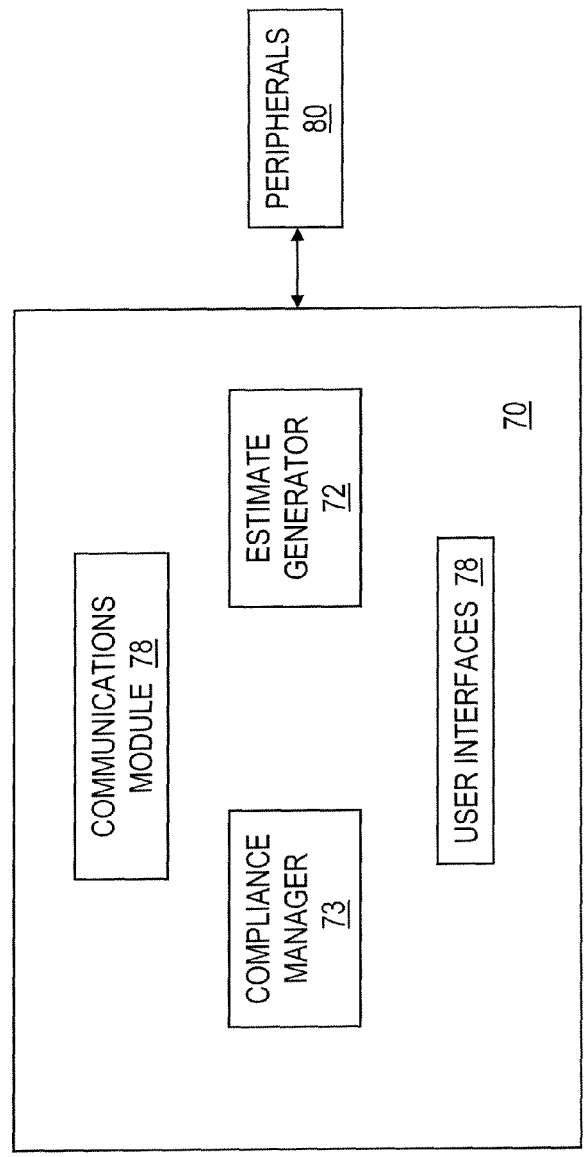
FIG. 3 is a high level block diagram illustrating an example implementation of an estimate input and compliance management tool in accordance with one example embodiment of the invention.

As discussed above with reference to FIG. 2, a stationary or portable computing system of various configurations can be used in one embodiment as the estimate entry and compliance management system in accordance with one embodiment of the invention. FIG. 3 is a high level block diagram demonstrating an example implementation of an estimate input and compliance management apparatus in accordance with one example embodiment of the invention. Referring now to FIG. 3, the apparatus in this example can be implemented utilizing a general or special purpose computing apparatus having a processing system configured to execute the instructions to perform the desired functionality. For example, desktop or laptop PCs, workstations, PDAs, hand-held computing devices, smartphones, and other now or later-developed computing platforms can be used to implement the estimate management apparatus. In one embodiment for example, the desktop or laptop computer used by a repair shop to manage other office functions can have the appropriate software loaded thereon to perform the compliance management functions.

In the embodiment illustrated in FIG. 3, the estimate management system 70 includes two modules to help perform the estimate management functions. An estimate generation module 72 is used by the estimator to prepare the estimate. The estimate generation module can, for example, be implemented as a general purpose of special-purpose software application configured to run on the system platform to allow entry of the estimate and other estimating functions. For example, the ULTRAMATE® product available from Mitchell International, Inc., is an example estimating software application that can be used to perform the functions of the estimate generation module. Other examples can include various Collision Industry Electronic Commerce Association (CIECA) compliant estimating platforms as would be known to those skilled in the art. In one embodiment, the estimate generation module (or a separate module) can be used to prepare the final invoices, which can also be checked by a compliance manager module.

Also illustrated in FIG. 3 is a compliance manager module 73 that can be used to facilitate comparing the generated estimate with the rule set appropriate for the given application. As discussed further below, a completed estimate prepared with estimate generation module 72 can be run through the compliance manager module 73 to determine whether the estimate is in compliance with the rules appropriate to the given situation. This can also be done with invoices as well. Compliance manager module 73 can be configured to do a real time (or near real time) compliance check as the estimate is being entered into the estimate generation module 72. Additionally, the compliance manager module 73 can do an overall compliance evaluation for a completed estimate (or invoice). Although illustrated as separate 'modules,' the compliance manager and estimate generation modules (and other modules such as, for example, an invoice module) can be implemented and installed as separate components or partially or completely integrated components.

Estimate management system 70 also includes a user interface 78 that allows for data entry by a user and also allows display of data and providing other information to the user. User interfaces 78 can include, for example, keyboards, keypads, mice and other pointing devices, touch screen displays, voice-actuated systems, and the like. Outputs to provide information feedback and other data to the user can include devices such as display screens, monitors, speakers, tactile devices and other user interfaces.

Additionally, the estimate management systems 70 can be configured to accept a variety of different peripheral devices 80 to facilitate additional functionality. For example, printers, scanners, faxes, plotters, and other like devices can be used to provide further data output and also provide a vehicle for data input. Likewise, bar code readers, RFID readers and other data entry mechanisms can be used to facilitate electronic data gathering. Although not illustrated, data storage can be provided to facilitate record keeping event tracking, statistical analysis, reporting, and other functions. Also not illustrated are other applications and other modules that also can be running on the estimate management systems 70. As one example, where the estimate management system 70 is implemented utilizing a desktop computer, that computer may have other office applications running such as the MICROSOFT OFFICE® and others.

Also provided in the example illustrated in FIG. 3 is a communication module 78 configured to allow communication of the estimate and other information between the estimate management system 70, the carrier or other third party payor, and other third parties that may be involved in the process. As discussed above, communication interface can take a number of different forms and provide communication across a number of different media including across the internet or other communication network. As will be apparent to one of ordinary skill in the art after reading this description, other architectures and configurations can be utilized to implement the estimate management system 70.

In another embodiment, an estimate compliance report can be generated automatically by compliance manager module 73 to provide information not only to the estimator but also to the carrier or other reviewer regarding the status of compliance or noncompliance regarding the estimate. In one embodiment, the estimate compliance report can be automatically attached with the estimate that is transmitted back to the carrier for review and approval.

Figure 4:
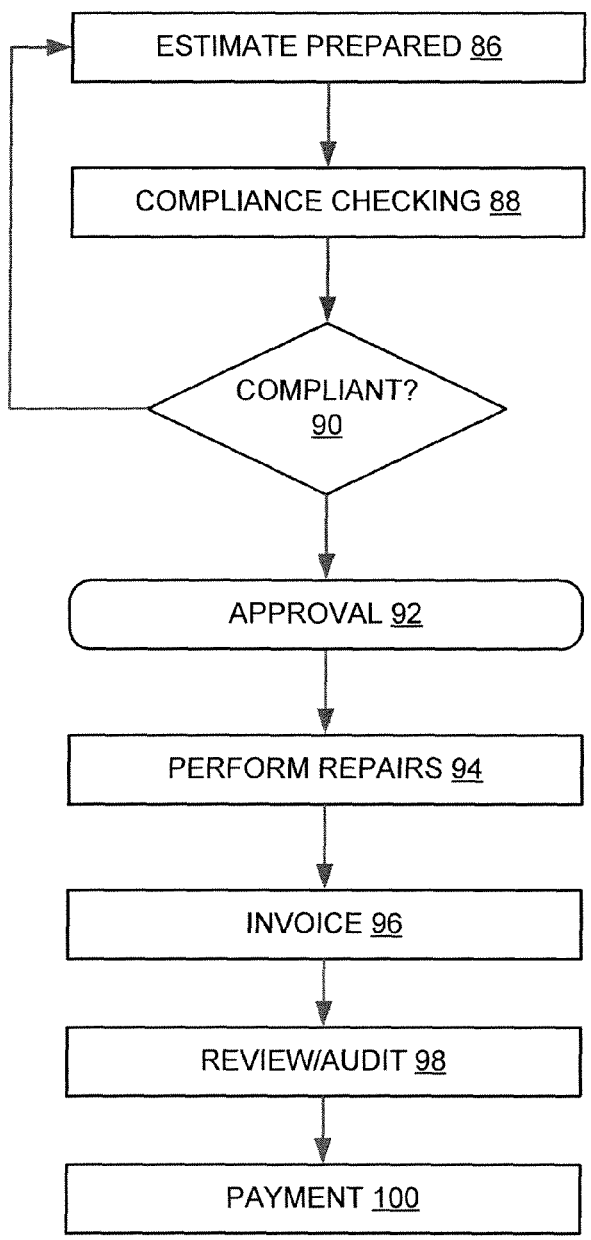
FIG. 4 is an operational flow diagram illustrating an example process for conducting remedial activity in accordance with one embodiment of the invention.

As discussed above, various embodiments can be implemented to provide estimate management and compliance verification in accordance with the present invention. FIG. 4 is an operational flow diagram illustrating an example process for conducting remedial activity in accordance with one embodiment of the invention. Particularly, the embodiment described herein is one in which estimate compliance checking is performed locally by the local estimator or adjustor prior to transmitting the estimate to the carrier or other third party provider for approval.

Referring now to FIG. 4, in a Step 86, the estimator prepares an estimate and enters it into his or her local estimate compliance system. As discussed above, the estimate can be entered into a laptop, PDA, or any other local computing device by the estimator at his or her location. General purpose applications (such as spreadsheets, for example) or application-specific estimation applications can be used to assist in generating the estimate. In one embodiment, the estimation generation application is to some extent tied to the compliance application to allow the entered estimate data to be gathered and read by the compliance manager application for compliance verification. In another embodiment, the estimator application will not allow saving of estimates without processing of the estimate by the compliance manager to ensure that estimates get checked at least once. In yet another embodiment, the estimate generator and compliance manager are fully integrated modules.

Shop-specific hourly rates, specific product codes, and other information used by the shop in preparing estimates can be used to prepare the estimate. In a Step 88, the completed estimate is audited to check for compliance. In one embodiment, one or more rule sets are provided by the carrier or other third party to the local estimator against which the estimate can be audited. In this context, the estimate can be verified against the specific rules to see if one or more items in the estimate are out of compliance. As indicated by decision Step 90, if the estimate does not comply with the rule set, the estimate is reworked and rechecked against the rule set to ensure compliance. Alternatively, reasons for non-compliance can be entered by the estimator to allow the estimate to be transmitted for approval with exceptions noted.

In one embodiment, the compliance check can be completed line by line as parts, labor rates, hourly requirements, or other data is entered into the estimate application. In this manner, errors, noncompliance or other issues can be flagged as the estimator is entering the data. In another embodiment, the completed estimate can be checked for compliance by passing the estimate through the compliance manager after it has been prepared, and areas of noncompliance can be flagged to the estimator to go back and correct. A final pass-through compliance check such as this can be useful to spot overall compliance issues that might not be flagged on a line by line basis.

For example, consider an example rule set wherein one of the rules requires that a certain percentage of like-kind-and-quality parts be used as opposed to original equipment replacement parts. With such a rule, it is useful to perform this check at the completion of the estimate such that the total quantity of original equipment parts and the total quantity of like kind and quality parts be compared against one another to ensure compliance with the threshold ratios. This example illustrates one scenario in which a line-by-line check may not reveal whether or not an estimate is in compliance. In one embodiment, however, various entries can be accumulated as entered to check total-estimate compliance as the estimate is being prepared. This can indicate to the estimator general compliance trends and may allow the estimator to adjust parts selection (or other decisions) to improve his or her chances of meeting the compliance goals. Textual, graphic and other indicators can be provided to the estimator to keep track of these values along the way.

To better illustrate this scenario, consider again the example where there is a requirement of a threshold ratio of like-kind-and-quality parts to original equipment parts. In this scenario, the compliance management system can track the ratio on an ongoing basis as the estimate is being entered, and provide the estimator with information as to his or her compliance up to that point. This can, for example, allow the estimator to adjust his or her decision making process in preparing the estimate to aim for compliance with the completed estimate.

As discussed above with respect to Blocks 56, 58 and 60, once the estimate has been checked for compliance it can be sent to the carrier for approval, whereupon subsequent compliance checks can be performed and a manual review and audit can also be performed. As illustrated by Step 92, when the estimate is deemed to be in order, the carrier can provide its approval to the estimator so that in Step 94 the repairs can be conducted.

Once the repairs are completed, in a Step 96 a final invoice can be prepared to be sent to the carrier for reimbursement. As with the estimate, the final invoice can be checked by the compliance management module to ensure that the job was invoiced in accordance with the applicable rule set. Thus, in one embodiment, the estimator module or other like module can be used to prepare the final invoice to facilitate a more automated compliance checking process. The local repair facility can also review the invoice for accuracy and completeness before forwarding to the carrier for reimbursement. In a Step 98, the carrier can review and audit the final invoice electronically or manually prior to issuing payment on the invoice in Step 100. As discussed above with reference to FIG. 2, data and information gathered and prepared along the way can be stored for historical record keeping purposes, statistically analysis, and reporting. This information can also be used to drive updates, changes and evolution of the system.

Figure 5:
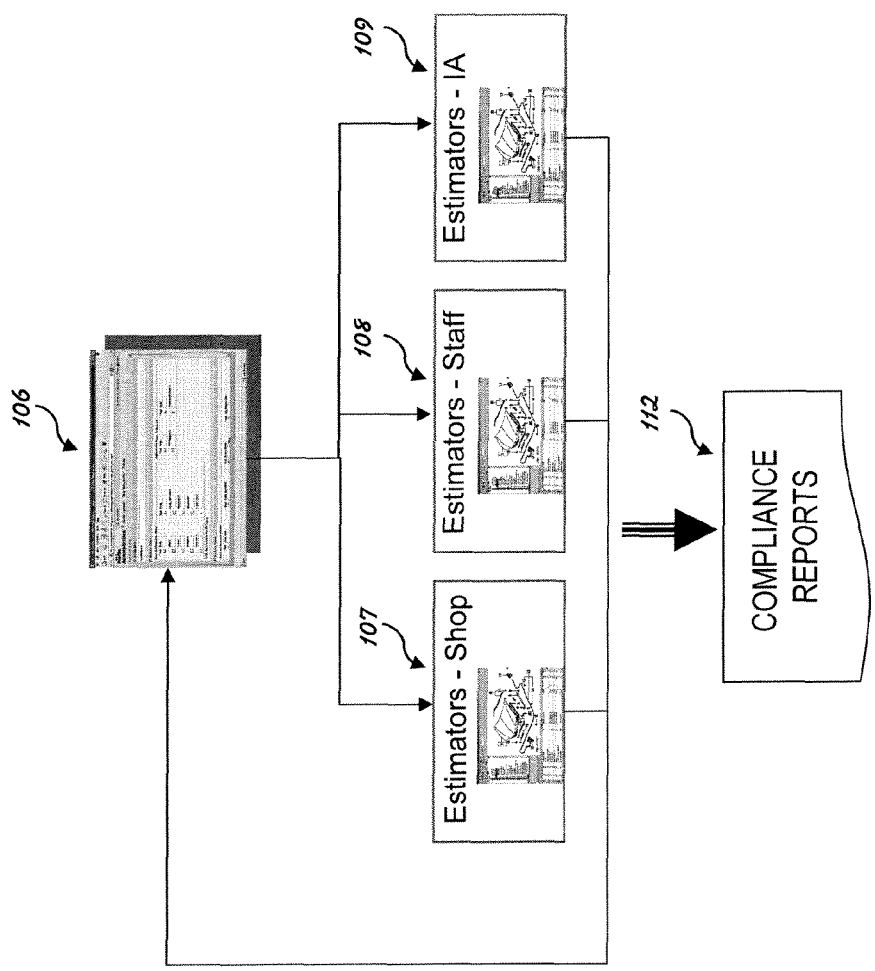
FIG. 5 is a conceptual block diagram illustrating an example process for managing and distributing rules or rules profiles in accordance with one embodiment of the invention.

As discussed above, various rules sets comprising one or more rules can be created and distributed to various estimators and billers to provide rules under which remedial activities are to be performed. FIG. 5 is a block diagram illustrating an example process for managing and distributing rules in accordance with one embodiment of the invention. Referring now to FIG. 5, a profile manager 106 can be provided as a platform under which a carrier or other provider can manage the creation, distribution, maintenance, and update of various rule sets. Profile management system 106 can be used by a carrier or other provider to create, distribute, manage and update the various rules that are used in the estimation and invoicing process. Profile management system 106 can be implemented utilizing a general or special purpose computing system. Like estimate management systems 70, profile management system 106 can be implemented in using a desktop or laptop computer, a work station, a PDA, or any other computing device. Indeed, in one embodiment profile management, compliance management, and estimate generator modules can share the same platform.

In accordance with one embodiment of the invention, rule sets can be created and distributed to the remediation facility for compliance management purposes. In one embodiment, an administrator can create rules with characteristics distinct to a particular region, locality or other geographic vicinity. Additionally, shop or facility-specific rules can be created that are specific to a given repair or other remediation facility. The created rule sets can be distributed electronically to the estimators 107, 108, and 109 via communication mediums such as, for example, the internet or other communication network or channel. In one embodiment, rule sets can be distributed using tools such as Web Services tools.

Version management can be implemented to manage various versions of the rule sets and updates can be distributed individually or within defined regions or other subsets. Additionally, profile statuses can be tracked among the various estimators and shops such that a compliance manager can easily determine which rule sets and which versions of the rules, etc., have been downloaded to a given facility. This information such as downloaded version numbers, etc., can also be used when an estimate is received from a shop for verification to determine whether an estimate that has been marked as compliant is, in fact, compliant with the latest version of the rule set. In one embodiment, the various estimators and shops can be configured to receive only read-only versions of the rules such that end users cannot change, delete or otherwise modify the rules or profiles.

The above embodiment contemplates a scenario wherein one or more rules are generated on a server system and distributed to one or more clients. For example, an insurance carrier may create one or more rules and distribute them (whether in rule sets or not) to estimators, repair shops and other locations for use. In another embodiment, the invention can be implemented to allow rules can be created locally at a client site. In such an embodiment, a client device can be used to create one or more rules. In one embodiment, locally created rules may be submitted for approval prior to use or directly implemented, depending on the compliance goals.

The rules that relate to compliance can relate to any of a number of different factors or parameters associated with the remedial activity. Although the options for rule parameters and rule types are virtually unlimited, a specific example in terms of the example environment is now provided to illustrate just a sample of the types of rules can be included. For example, with automobile repair and restoration, rules can cover things such as labor rates, tax rates, parts markups and discounts and so on. Additionally, labor times can be specified such as times for activities like color coating, sanding and buffing, blending and tinting, frame set up, and other max allowable times. Additionally, labor times can be specified as fixed numbers, caps for ranges for repair lines and so forth. Also, labor times for partial or spot re-finish alerts can also be provided.

As a further example, rules based on material usage can also be specified. For example, rules can specify material amounts, types, brands, costs, and so on. Material usage rules can also specify items such as paint materials allowable, shop materials, hazardous waste allowances, allowable towing rates and ranges, rental reimbursement and so on. Parts and betterment management rules can specify, for example, alternative parts guidelines, and betterment component management. As still a further example, the rules can specify what administrative data, if any, is required as a part of the estimate. For example, the rule may specify whether a VIN, claim number, point of impact information, vehicle mileage, deductible information, inspection dates and others, are required to be entered by the estimator or otherwise obtained for the compliance management process. As described in more detail below, in one embodiment, the system is configurable to allow custom rules to be created to virtually any component, operation, or labor category and for various vehicle types, years, conditions, mileage and so forth. Also, rules can be implemented to perform p-page checking to check, for example, for missing p-page items or not-allowed items.

Figure 6:
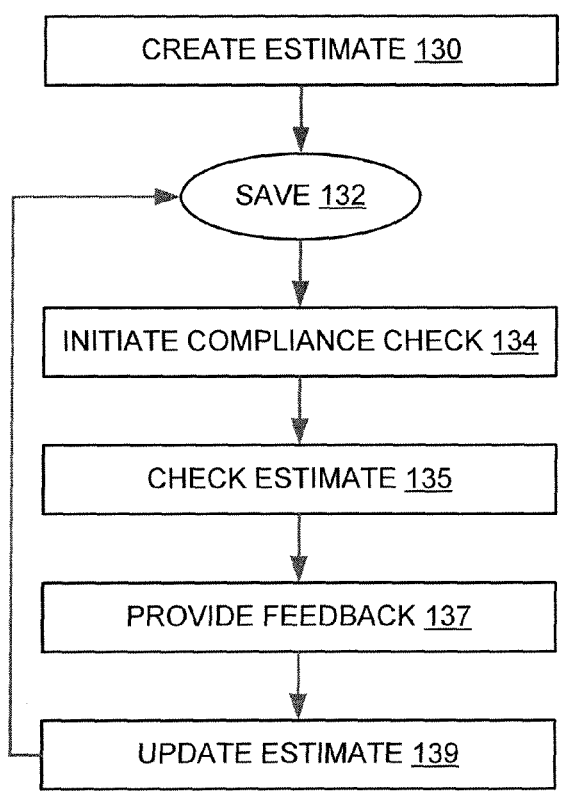
FIG. 6 is an operational flow diagram illustrating a process for creating and compliance checking an estimate in accordance with one embodiment of the invention.
Figure 7:
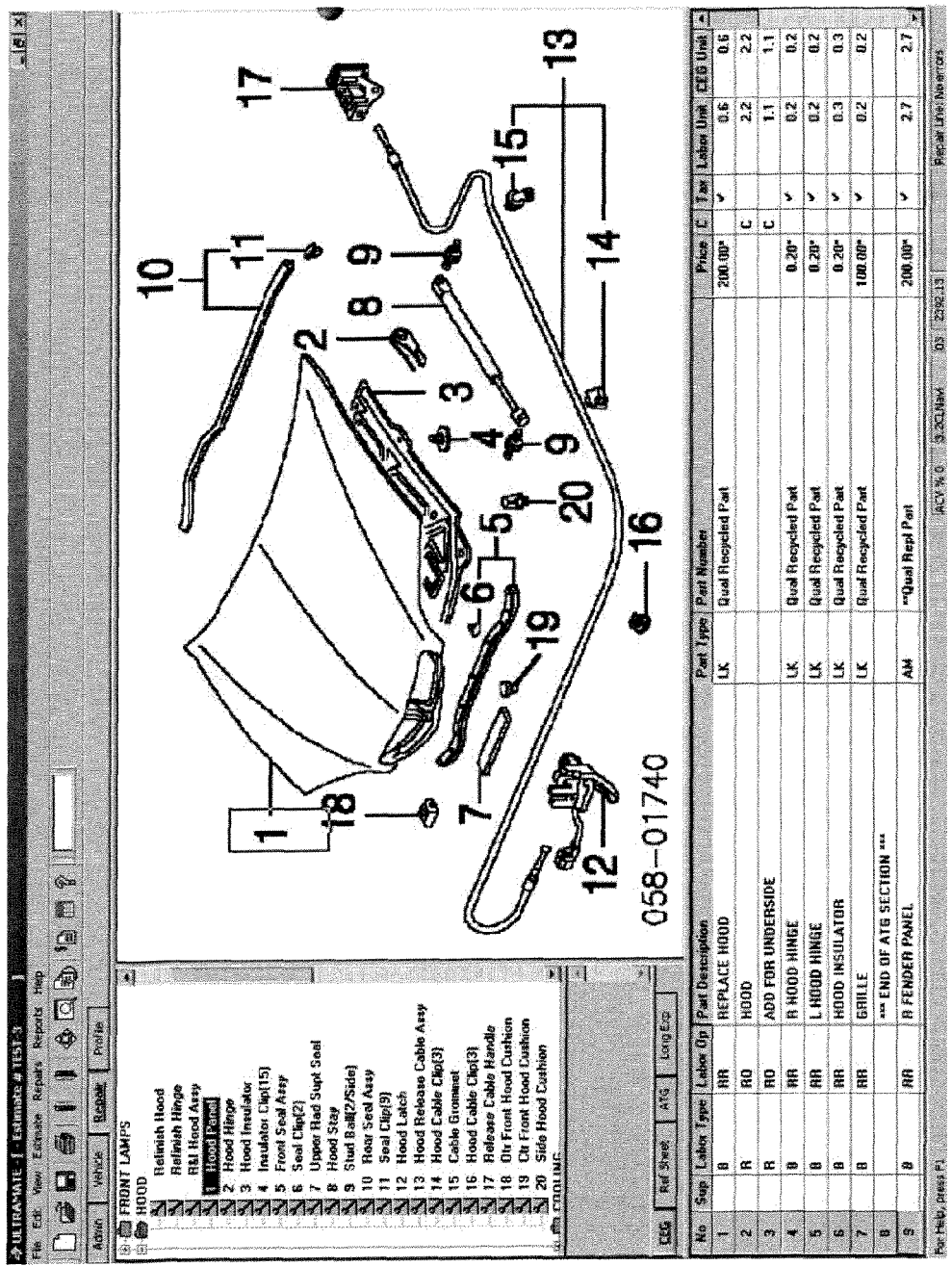
FIG. 7 is an exemplar of an interface displayed to auto repair personnel for generating estimates in accordance with one embodiment of the invention.

FIG. 6 is an operational flow diagram illustrating a process for creating and compliance checking an estimate in accordance with one embodiment of the invention. Referring now to FIG. 6, in a Step 130, an estimate is created. As discussed above, in one embodiment, the estimate can be created utilizing any number of tools such as, for example, the UltraMate estimating tool available from Mitchell International, Inc. Further to this example, FIG. 7 is a diagram illustrating a screen shot from the UltraMate estimating software illustrating a portion of the estimate being prepared for the front end of a vehicle. Although the invention is discussed in terms of the UltraMate software, one of ordinary skill in the art after reading this description will understand how the invention can be utilized with other tools to create the estimate.

Once the estimate is created, it can be saved in step 132 and a compliance check initiated in Step 134. To perform the compliance check, the compliance manager module 73 or other like module is launched to review the estimate and provide feedback to the appraiser about the estimate status. In one embodiment, the compliance manager module 73 can be automatically launched. The compliance manager module 73 checks the estimate in step 135 and provides feedback to the appraiser regarding the status of the estimate in terms of compliance in step 137. In one embodiment, the feedback can take the form of a message, pop-up window, audio stream, or other communication to the user, one example of which is discussed below with reference to FIG. 8. Based on this feedback, in a step 139, the estimate can be updated in accordance with the feedback provided. As indicated, the updated estimate can be resaved and rechecked for compliance until such time as the estimator or other reviewer is satisfied with the level of compliance.

FIG. 8 is a diagram illustrating an example pop-up window that can be provided to the appraiser by the compliance manager module 73. Referring now to FIG. 8, this example illustrates a pop-up window that can be displayed to the appraiser to highlight or callout exceptions (for example, non-compliant items) in the estimate as compared to the rules set. The window illustrated in this example includes a drop-down selection box 151 that can allow the user to sort or filter the results in a manner appropriate for viewing and addressing the exceptions. In the example illustrated in FIG. 8, the sort selection is "all exceptions" indicating that all non-compliant items are displayed or displayable to the user.

Column 152 is a line item column illustrating the line number of the estimate in which the exception is found. This can be used to facilitate location of the out of spec item by the appraiser. The description column 153 provides a description of the items that is out of specification. For example, the first line of the description column indicates that the item that the exception item is that the hazardous waste exceeds the authorized carrier level. The actual column, column 154, illustrates the actual cost bid in the estimate for the item. The guideline column, column 155, shows the guideline amount for that item based on the rule set. Thus, for the hazardous waste line-item column, the actual amount in the estimate in this example is $40.50 while the guideline is limited to $5.00. Therefore, this item is out of specification.

As another example, this window illustrates in the fourth line down that the guideline in the rule sets specifies that 10% alternate parts are to be used. The exception report illustrates that currently there are no alternate parts selected. Therefore, in reviewing this report, the appraiser can understand why the estimate is out of specification. A Print button, 157, can be provided to allow the report to be printed by the user. A Back button, 159, can be provided to allow the user to step back to a previous screen. Additionally, an Add Estimate Notes button, 160, can also be provided to allow the appraiser to explain the reason for an exception and request a variance or override of that exception.

Figure 9:
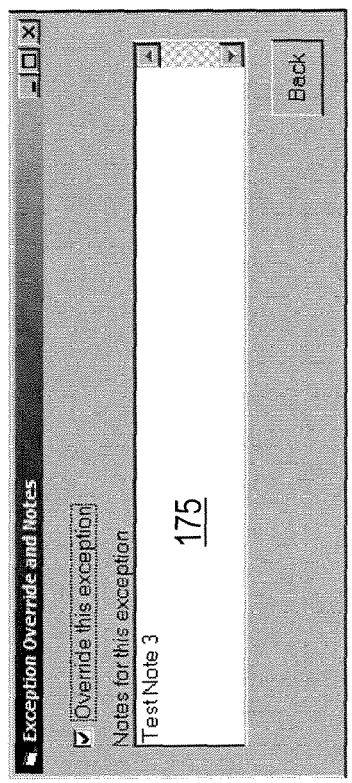
FIG. 9 is a diagram illustrating an example pop-up window that can be provided to a user in accordance with one embodiment of the invention.

FIG. 9 is a diagram illustrating an example pop-up window that can be provided when the user clicks the Add Estimate Notes button, 160. Referring now to FIG. 9, when an exception is highlighted and the Add Estimate Notes button is selected, the window pops up allowing the appraiser to select whether or not to override the exception and to provide an explanation for the exception. For example, the user may have been unable to obtain alternative parts and thus would so note in the notes section of the window 175. These notes 175 can be tracked with the estimate and used in subsequent review and approval processes to determine whether the estimate is acceptable with the noted exception.

An additional feature that can be included with the present invention is the ability to prepare and provide compliance results reports. Such reports can be prepared on an estimate by estimate basis to show compliance results for a given estimate or job. Additionally, in another embodiment, compliance results reports can be run over a series of estimates or period of time to show compliance history for that series or period. For example, compliance results reports may be consolidated and run for a given repair facility, a given appraiser, a given region, or any other subset of reports as may be identified by a user of the system.

FIG. 10 is a diagram illustrating an example of a compliance results report in accordance with one embodiment of the invention. Referring now to FIG. 10, the compliance results report includes header information that provides background for fundamental information on the estimate. 212. For example, the header information illustrated in the example report of FIG. 10 includes a claim number, an estimate ID, a supplement number, identification of the owner/insured, an estimate commit date, an estimate gross total, a profile name, (i.e., rule name), a profile version (rule version), and an identification of the system used to generate the estimate.

A status line 214 provides a status of the current estimate, which in this example indicates that the estimate is out of compliance. Noncompliance items 216 provides a listing of items in the estimate that are not in compliance with the identified rule and version number. For example, illustrated in FIG. 10 are six noncompliance items along with a description of the line number in the estimate in which they can be found, a description of the noncompliance item, the actual value for the item in the estimate and the guideline established by the rules. For example, the last noncompliance item in the list 216 references line number 15 of the estimate, is described as "last rate does not equal guideline (RQD)" and shows that the actual value quoted in the estimate is $45.00. This line also shows that the guideline value per the rule set is $36.00. Thus, an appraiser can determine what is in and out of compliance based on the out-of-compliance items list 216.

The illustrated example also shows an area for estimator comments 218. In this example, the estimator provided notes as to why certain items may be out of compliance. Thus, an auditor can review the notes in conjunction with the noncompliance items to determine whether to approve the estimate despite the noncompliance items.

Also, the example of FIG. 10 further illustrates the compliance history for this estimate 217. In this example, revision 3 of the estimate is illustrated in the history as having failed the compliance test and the exceptions noted as a result of that compliance test are listed in line item format in the compliance history section 217 of the report. The compliance report as well as other reports in one embodiment can also be viewed by the appraiser preparing the estimate. As such, the appraiser can use this information to correct or adjust the estimate to better conform to the rules provided by the carrier. In one embodiment, this can be done by the appraiser locally to bring the estimate into compliance, or closer into compliance, and to provide notations for the out of compliance items prior to transmitting the report for authorization and approval. This can provide the added benefit of streamlining the process and reducing the amount of give and take required between the appraiser and the approver before final approval is provided. Additionally, this can have the added benefit of reducing the amount of review time required by an approver as the number of revisions are reduced and the level of compliance with a submitted estimate might be expected to be higher. Additionally, this can also have an additional benefit of incentivizing the appraiser to remove as many exceptions as possible and increase his level of compliance on a matter-by-matter basis.

Figure 11:
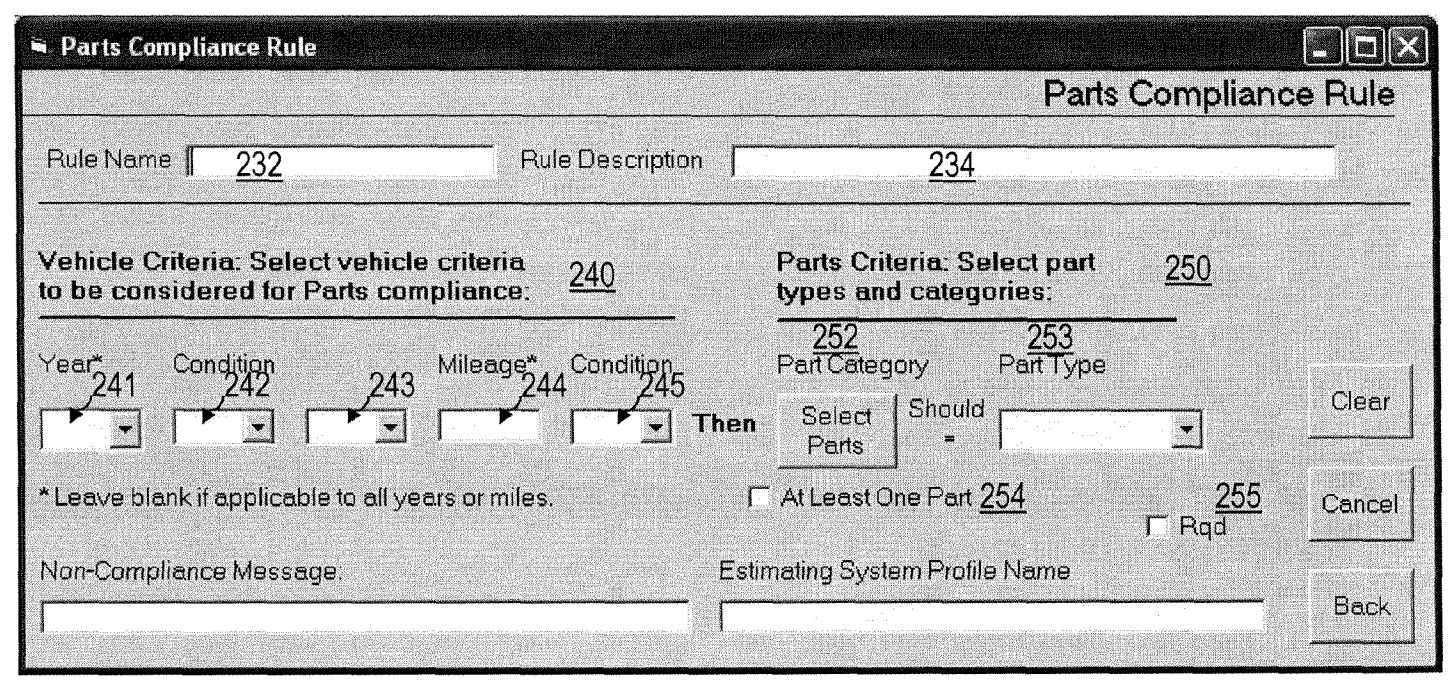

In accordance with another aspect of the invention, a rule creation module can be provided to allow a carrier or other entity to create one or more rule sets for distribution to the various appraisers. In one embodiment, a custom user interface or GUI can be provided to simplify the process and to allow intuitive interaction with the system for creation of custom rules for a variety of circumstances and situations. Created rules can be used by the carrier, and can also be distributed to the various appraisers as discussed above. An example of a rules creation module in accordance with one embodiment of the invention is now described. FIG. 11 is a diagram illustrating an example window that can be implemented with the rules compliance module to create a rule in accordance with one embodiment of the invention. Referring now to FIG. 11, the example window has various input elements, each of which are now described. A Rule Name field 232 can be included to allow the user to enter the name of the rule that he or she is creating. Rules entered may be arbitrary or they may be based on requirements or conventions established by the entity.

Although not illustrated, a drop down window, ellipses button or other selection mechanism can be utilized to allow the user to select a rule name from a set of rule names. The Rule Description field 234 can also be provided to allow the user to enter a description of the rule. As with Rule Name field 232, Rule Description field 234 can also utilize a free text entry format as well as a drop down button, ellipses button, or other mechanisms to select predefined descriptors.

The example illustrated in FIG. 11 also includes Vehicle Selection Criteria area 240. This Vehicle Selection Criteria area 240 includes fields for the user to select a Vehicle Year 241, a vehicle-year Condition 242, a Boolean Operator 243, Vehicle Mileage 244 and a mileage Condition 245. Vehicle Year field 241 allows the user to input a year of vehicles for which the rule will apply. Vehicle Condition field 242 allows the user to select whether the condition applies to that year only or to vehicles in that year and older or in that year and newer. As illustrated, drop down menus or other selection items can be provided to allow the user to select the year and the year condition from a series of predefined selections.

The Vehicle Mileage field 244 allows the user to enter the vehicle mileage for which the rule applies and a Mileage Condition field 245 can be included to allow the user to identify whether it is for vehicles with only that mileage, vehicles with that mileage or higher or vehicles with that mileage or lower. Boolean Operator field 243 allows the user to enter a condition such as a an AND or an OR condition for application for the year and mileage conditions.

Figure 12:
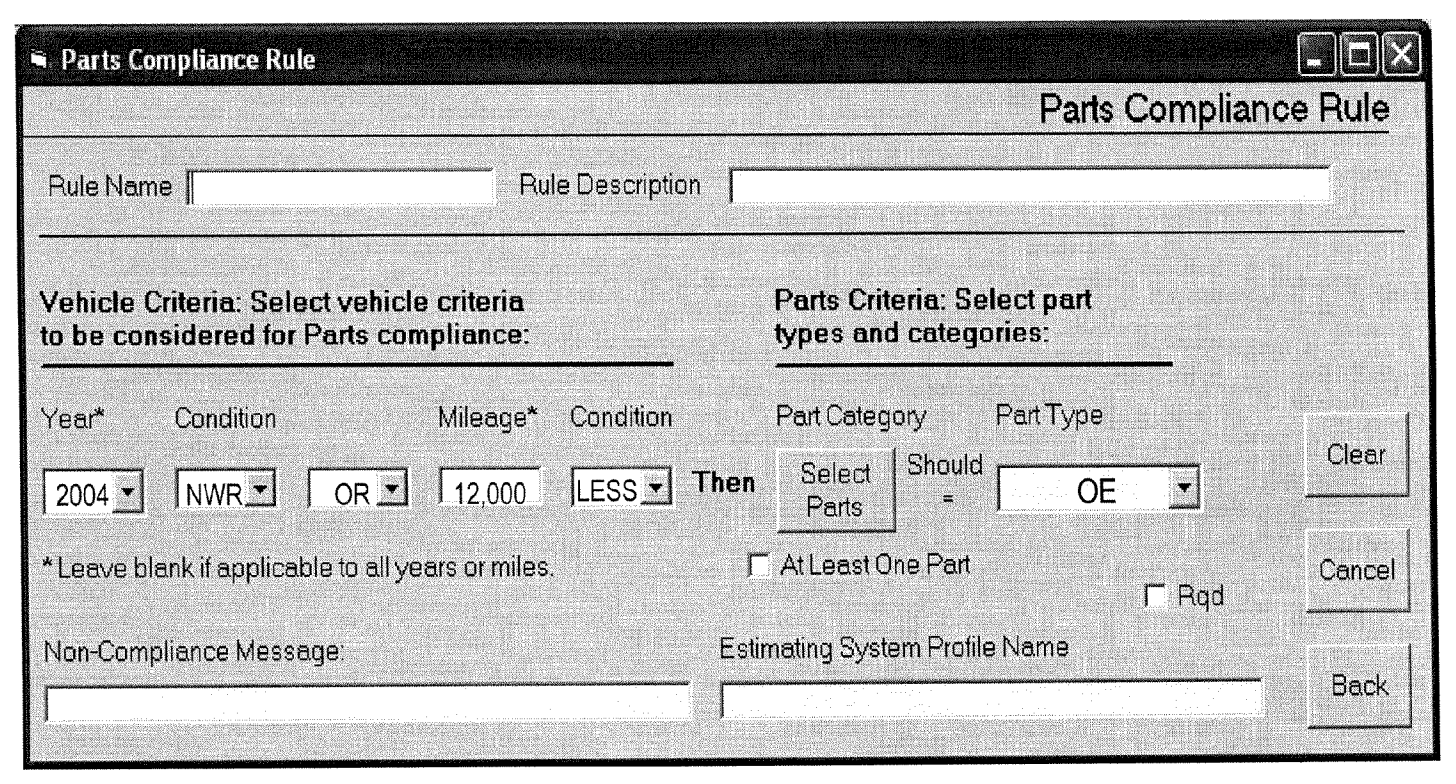

FIG. 12 is a figure illustrating an example of role creation screen with example vehicle criteria added. Referring now to FIG. 12, in the illustrated example, vehicle year is entered as 2004 and the year condition is entered as and "NEWER." The Boolean Operator 243 is entered as OR. The mileage is entered as 12,000 and the mileage condition 245 is entered as "LESS." Thus, in this example, this rule would be applicable to all vehicles that are either model year 2004 and newer or that have 12,000 or less miles. As this example illustrates, other years and mileage criteria and ranges can be entered in specifying the rule applicability. Additionally, alternative vehicle criteria can be used as well. Still further, the user may elect to not make a rule specific to a particular year or year range and may, therefore, leave the year field blank making the rule applicable to vehicles regardless of their model year or likewise leave the mileage field blank making the rule applicable to vehicles regardless of their mileage.

As a further alternative, instead of mileage and year conditions such as or newer, or older, or more, or less, ranges can be provided to allow the user to specify a specific year or mileage range for which the rule would apply. As further examples of additional vehicle criteria that can be utilized in preparing the rules, vehicle criteria such as vehicle type (for example, sedan, sport, compact, SUV, convertible, and so on), vehicle class (for example, car, truck, etc.), vehicle duty (for example, commercial use, personal use, etc.) can also be provided. Although not illustrated, selections such as these can be provided with fields and the illustrated in another window.

Returning again to FIG. 11, the example parts compliance rule window also includes a Parts Criteria section 250. Parts Criteria section 250 includes a Part Category Selection button 252 and a Part Type field 253. Also, an at least one Part field 254 and a Required field 255 are also provided in the illustrated example.

Figure 13:
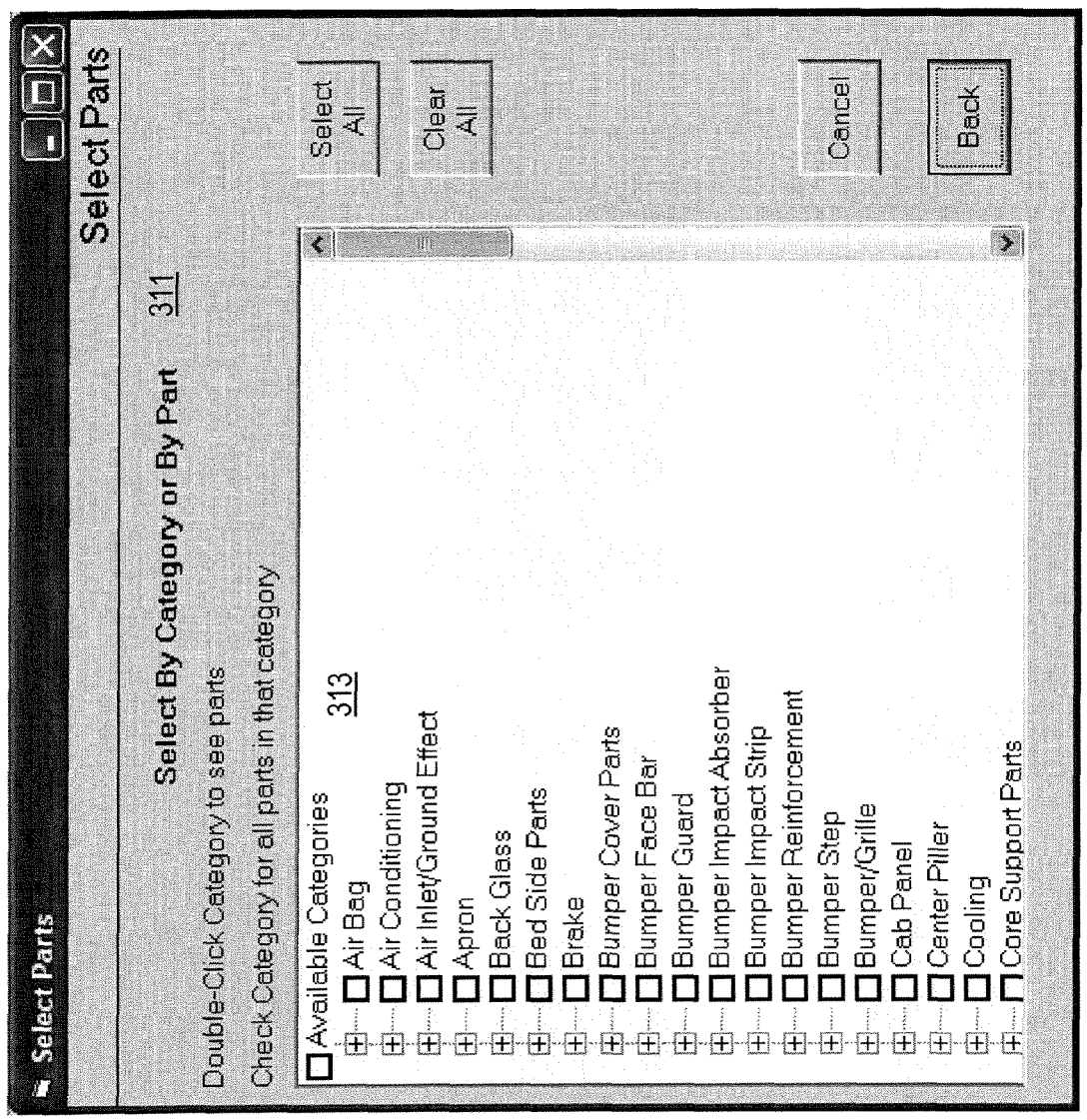
FIG. 13 is a diagram illustrating an example user interface that can be implemented to facilitate parts identification in accordance with one embodiment of the invention.

In the illustrated example, clicking the Select Parts button 252 brings up a window from which the user can select the part or parts to which this rule will apply. FIG. 13 is an example of such a window that allows a user to select one or more parts for which the rule will apply. Referring now to FIG. 13, select parts window 311 includes a selection frame 313 that allows a user to select parts by category or to select individual parts. Checking the check boxes for an available category or for an available part allows the user to select that part or that category for inclusion in the rule.

In this example, the parts are arranged hierarchy based on category and one or more of the categories can be drilled into to select individual parts within that category. For example, if the user wishes to apply the rule to the broad category of any air conditioning part, the user can simply check the Air Conditioning box thereby selecting that category. If, on the other hand, the user only wishes the rule to apply to a high pressure line for the air conditioning system, for example, the user can expand the air conditioning folder to reveal the list of items underneath the air conditioning heading and then select the high pressure line. Additional layers of hierarchy can be included depending on the structure and makeup of the part category selected. The user could then browse through the various selections to find the high pressure line (or other part) for which the user wishes the rule to apply. In one embodiment, subsequent 'folders' may be provided to handle the additional layers of hierarchy.

Having selected the category or categories and part or parts, the user can return to the rule creation menu to finish creating the rule for those selected categories or parts. Although not illustrated, a text entry field can also be provided allowing the user to manually enter the name of the part or parts (or categories) for which the rule is to be applied. For the selected part or category, the user can select the part type 253 that will apply. For example, the user may select that the specified part or parts be original equipment parts, like kind and quality parts, used parts, and so on. In one embodiment, this part type selection can be made for all parts in the selection or a percentage of the parts, or other metrics can be applied. In one embodiment, the user can be provided with the option of not specifying any parts, thus making the rule applicable to all parts for the identified vehicle(s).

Although not illustrated in FIG. 11, the option can also be provided to allow the user to specify whether betterment or depreciation applies. This can be provided, for example, in place of or in addition to the part-type definition. Thus, for example, a check box or other indicator can be provided to allow the user to specify whether betterment or depreciation applies to the identified part or parts (or to all parts for the identified vehicles).

Additionally, as illustrated in FIG. 11, a checkbox can be provided to indicate that at least one part of the identified parts should be of the specified part type. This is indicated by checkbox 254. Checkbox 255 can be included to allow the user to specify whether this is a required or optional rule. In one embodiment if the rule is marked as a required rule, the estimator will not be able to submit the estimate unless the estimate complies with this rule. Likewise, in one embodiment if a rule is not marked as required a user may be able to obtain an exception for the rule by noting the reason for noncompliance when submitting the estimate.

The example illustrated in FIG. 11 also provides fields for the rule creator to provide a noncompliance message. In this field, the user can enter a message that he or she wishes to appear when the estimator prepares an estimate that is not in compliance with this rule. For example, if the rule requires that aftermarket parts be specified for replacement body panels and the estimate specifies new parts, the noncompliance message could state "replacement body panels must be aftermarket." As another example, the rule may specify that air bags must always be original equipment. As such, the noncompliance message for this instance could state that airbags must always be original equipment parts.

In one embodiment, the fields for vehicle criteria and parts criteria (as well as other fields, as appropriate) can be tied to the same or similar fields in the estimating software such that there is a correspondence between the created rules and the line items in the prepared estimate. For example, even if they are separate software packages, in one embodiment the compliance module and the estimator module can be implemented to use common designators for vehicles, years, mileage, part numbers and so on. In another embodiment, a translation interface can be provided to allow identifiers from one package to be read by the other. This can help to ensure that a match between items is made.

In one embodiment, a module is provided to create the rule based on the vehicle criteria and parts criteria entered. For example, in one embodiment a rule generation module can accept the input provided by the user and format the information into the proper syntax to thereby generate the rule. Thus, a properly formatted rule can be created based on the supplied user input. For example, consider the example data input as illustrated in FIG. 12. In this example, the rule generation module would create a rule that states that for all vehicles that are either model year 2004 and newer or that have 12,000 or less miles, the identified part(s) should be original equipment. The rule can be created in syntax that can be recognized by a computing system that compares data input (from an estimate, for example) with the rule set to check for compliance. Thus, in one embodiment, the user does not need to manually create a rule in the appropriate format, language or syntax required by the computing system. Therefore, the user does not need to learn special programming languages or commands. Instead, the user can simply specify the parameters and the rule generation module can be implemented to provide the appropriate output in machine-readable form. Additionally, as these examples illustrated, the user can be provided with drop-downs, lists, radio buttons, check boxes and other input tools such that items like vehicle parameters and criteria, parts identifiers, and so on are provided by the system. Thus, the user does not need to retain a memory of such items or a separate listing. Prompts and predefined inputs can be provided by the system for vehicle and parts criteria, and the user can select from among the choices given to input the data from which the rule is automatically created.

Figure 14:
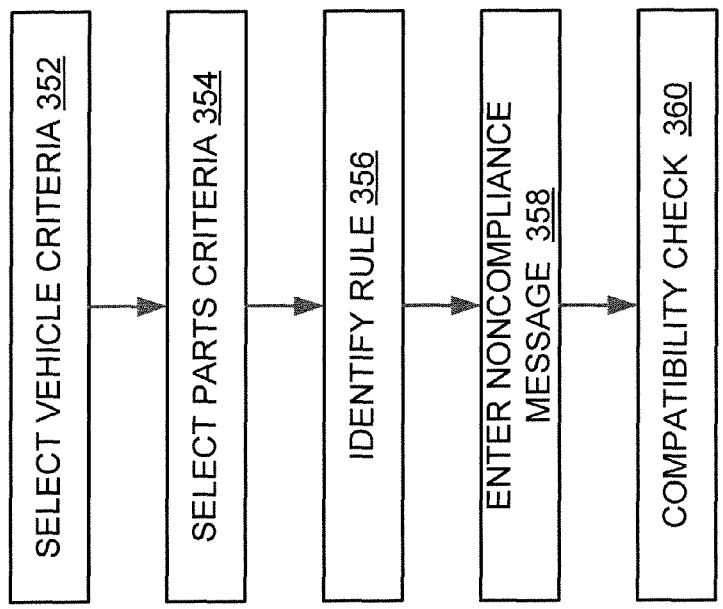
FIG. 14 is an operational flow diagram illustrating an example high-level process for rules creation in accordance with one embodiment of the invention.

FIG. 14 is an operational flow diagram illustrating a high level process for rules creation in accordance with one embodiment of the invention. Referring now to FIG. 14 in a step 352, the rules creation user selects the vehicle criteria for which the rule is to be applied. In this step, the user can select specific vehicles or categories of vehicles to which the rule will be applied or alternatively specify those from which the rule will be excluded. An example user interface for allowing for such a selection to be made was provided above with reference to FIG. 11, vehicle selection criteria 240.

In a Step 354, the user can select the parts criteria for applicability of the rule. An example of a user interface that can be provided for this was discussed above with reference to FIG. 11 as parts selection criteria 250. In a Step 356, the user can also provide a rule name and a rule description to facilitate identification of the rule for future use. Rule names and descriptions can be useful in rules management and in applications where a rules library is maintained.

In a Step 358, the user provides a noncompliance message that will be displayed to the appraiser or other party upon encountering an exception to the rule. Preferably, the noncompliance message is sufficiently descriptive to explain the estimator why the estimate, or part thereof, is in violation of the rule. Additionally, the noncompliance message can provide guidance on how to come into compliance. Further, a noncompliance message can indicate situations in which an exception to the rule will be granted.

In a Step 360, completed rules can be compared to one another to determine whether there are any conflicts among the rules. For example, consider a situation where a user creates a rule that says all vehicles model year 1998 and older or having greater than 60,000 miles require used parts for body panels. Consider a second rule that says all vehicles of a particular make and model require new original equipment body panels. In this circumstance, for vehicles of that particular make and model that happen to be older than model year 1998 or have greater than 60,000 miles, there is a conflict in these two rules. The rules compatibility check can be used to identify situations in which such conflicts may arise. A conflicts module can be implemented such that rules conflicts checks can be run among various rules at any time. In one embodiment, a conflicts module can be implemented to check for conflicts among rules identified by a user, or among rules identified as being associated with a profile. In this manner, profiles can be created and conflicts checks limited to a given profile so that conformance among all the rules within a profile is ensured. This embodiment can allow multiple rules to exist in a library of rules, even where conflicts exist.

In one embodiment the system can be implemented such that the more specific rule will prevail over the more general rule. In another embodiment, the system can be configured to require manual intervention to resolve rule conflicts. Rule conflicts can be resolved for example by deleting a rule, changing the rules such that they are no longer in conflict or by specifying to the system which rule will prevail in the event that a situation arises where there is a conflict between the two rules (for example the situation where a particular make and model is older than 1998). In yet another embodiment, the system can be configured to allow the user to assign a weighting to the rules such that rule conflicts can be resolved based on rule waiting. This can allow a form of prioritization to be made as the rule is being created to potentially avoid unresolvable conflicts.

Having thus described an overall process for automated rule creation, examples of a specific process for vehicle criteria and parts criteria selection are now described. Various factors can be included in the rule specification, such as vehicle class, make and model information, vehicle year, mileage, duty, and other criteria. Depending on the implementation, any or all of these criteria can be set forth as required information to create a rule. These criteria can be used as 'inclusive of' or 'exclusive of' to specify a subset of vehicles to which the rule will apply. For example, in one embodiment, the rules creation interface can be configured to ask the user to specify a vehicle year range and a vehicle mileage range to which the rule will apply, and to further allows the user to enter any make or model vehicles that the user wishes to be excluded from the specified subset.

FIG. 15 provides an operational flow diagram for a process of vehicle criteria selection in accordance with one embodiment of the invention. Referring now to FIG. 15, if the rule will be applied to a particular class of vehicles (decision Step 404) the user is prompted to specify the vehicle class to which the rule will apply in a step 406 and can be further prompted in step 408 to identify whether the rule is intended to include vehicles of the specified class or to exclude vehicles of the specified class. For example, the user may wish to specify that the rule being created applies only to light duty trucks and therefore would select light duty trucks as the vehicle class and select that the rule is inclusive of only light duty trucks.

In a Step 412 the user decides whether the rule will be make and model specific. If so, in a Step 414 the user can specify the make and model and in Step 416 determine whether the rule is applied only to that make and model or applied to every vehicle other than that make and model. Likewise, in a Step 418 the user can determine whether the rule will be year specific. If so, in a Step 420 the user can select the year or year range and in Step 422 whether it is inclusive or exclusive. As discussed above, the user can select a particular year, a range of years, or make a selection based on newer-than and older-than criteria.

Similarly, in Step 424 the user can determine whether the rule will be based on mileage specifications as illustrated by Step 424. If so, in a Step 426 the user can enter the mileage or mileage range and in 428 identify whether the rule is inclusive or exclusive of the identified mileage. As also discussed above, mileage can be entered as a particular mileage, a mileage range of specific mileages, or a greater-than or less-than mileage condition. Although not illustrated in FIG. 15, Boolean Operator conditions can be used such that the specified conditions can be combines as, for example, AND or OR combinations for determining rule applicability. As one of ordinary skill in the art would understand after reading this description, a rules creation interface can be created to query for input regarding any or all of these parameters, or other parameters as may be appropriate for a given application.

FIG. 16 is a diagram illustrating an example process for parts criteria selection in accordance with one embodiment of the invention. Referring now to FIG. 16, in a Step 442 a user identifies the part or parts to which the rule will apply or from which it will be excluded. As discussed above, this selection can be made based on part types, part categories, or particular specified line items. A hierarchical structure can be implemented such that parts can be selected based on categories, assemblies, subassemblies, components, and so on. This can be done to allow a high level of flexibility to the user in creating specific rules for particular parts as well as to allow more efficient operation by providing a selection of subassemblies, assemblies, modules, categories, and so on.

In a Step 444, the user is prompted to specify the part type for the rule. In other words, the user can specify whether original equipment parts are to be used, whether like kind and quality parts are to be used, whether refurbished or remanufactured parts are to be used and so on.

In a Step 466, the user can specify the requirement for the parts. In this step the user can specify the applicability of the part type requirement to the parts. For example, the user can specify that all parts be of the specified part type that a percentage of the parts of the specified part type that at least one or at least two of the parts be of the specified part type and so on. In one embodiment, the user can also specify whether this is a required rule or a guideline rule. In some embodiments, where it is a required rule, exceptions to the rule will not be granted but will only be granted under exceptional circumstances. Where there is a desired rule or a guideline, exceptions may be granted or granted only with explanation. Additionally, compliance with the rule can be tracked on an appraiser, shop basis, case-by-case basis or other basis to analyze compliance statistics and trends.

In another embodiment, rather than specifying separate rules for particular makes and models or for other classes or categories, make and model exceptions or other desired exceptions can be identified in the rules generation process to avoid issues of rule conflict. For example, in the context of the example conflict discussed above, a single rule can be created in accordance with the process illustrated in FIG. 15 that specifies the particular make and model in Step 414 and identifies the rule as excluding that particular make and model in Step 416 while at the same time the rule in Steps 420 and 422 specify that the rule applies to all vehicles model year 1998 and older and/or all vehicles of a mileage of 60,000 or greater. Creating a rule with each of these requirements will allow a single rule to be created with the particular make and model exception provided in the rule. Although the example discusses excluding a single make/model from the rule, in one embodiment, multiple exception criteria (for example, multiple makes/models, or other criteria) can be specified for rule exclusions.

Although not illustrated, rule creation is not limited to creating a rule for a single make and model or a single class or a single year range or single mileage range. For example, in one embodiment the user can be given the opportunity to specify multiple classes, makes and models, year ranges, mileage ranges and so on in the creation of a rule, or to leave a particular criteria field vacant (or be given an 'All' selection) to allow the rule to apply to all vehicles regardless of their status in that particular criteria. Additionally, although not illustrated in FIG. 15, other vehicle criteria can be entered including, for example, vehicle duty type (e.g., commercial, personal, and so on) or other criteria.

As these examples illustrate, the rule creation module can be implemented with varying degrees of feature richness. As the example illustrated in FIG. 12 highlights, the user is only prompted to specify Year and Mileage criteria as the vehicle selection criteria. Further to this example, the rule creation module may also give the user the ability to exclude vehicles meeting certain criteria (for example, make/model) from the subset. Toward another end of the spectrum, a rule creation module can be implemented to prompt the user to enter more types of criteria such as those discussed with reference to FIG. 15.

FIG. 17 is a diagram illustrating a window for displaying a list of created parts compliance rules in accordance with one embodiment on the invention. Referring now to FIG. 17, the rules list window 460 includes a listing of the rules 462 identifying them by name, a listing of the rules descriptions 464 for those rules, and a date 466, which can indicate the rule creation date or the last rule edit date. Feature buttons 468 allow the user to add new rules, edit existing rules, copy an existing rule or delete an existing rule. If a rule is selected, display area 472 allows a user to see the vehicle criteria noncompliance message and rule requirements for the selected rule.

Although not illustrated in FIG. 17, a display can also be provided to show the parts criteria for the selected rule. As this example illustrates, a parts rules library can be created and accessed through the rules list window to allow a user to use previously created rules in creating other profiles. Thus, a rules profile for a particular appraiser or shop or other entity can be created and particular rules or rule sets can be specified as part of that profile. Likewise, alternative profiles for other appraisers, shops or entities can be created based on existing profiles by copying profiles or copying rules from other profiles into a new profile. Rules for new profiles can of course be edited or modified as may be deemed appropriate for the profile being created. This rules library can be used to provide enhanced efficiency in the rules creation process. As discussed above with reference to FIG. 5, a profile management system 106 can be used to manage these profiles among the various estimators and entities, and manage distribution and updating of rules within the profiles.

As would be apparent to one of ordinary skill in the art after reading the above description, a number of different interfaces can be created and implemented to provide users with the ability to create compliance rules in accordance with the features and functionality described herein. FIGS. 18 through 24 provide a few additional examples of interface elements that can be used to form the user interface in accordance with these embodiments. These examples are by no means exhaustive but further illustrate examples of interfaces that can be utilized.

FIG. 18 is a diagram illustrating an example window that can provide a user interface for rule creation in accordance with one embodiment of the invention. Referring now to FIG. 18, similar to the embodiment in FIG. 11, the example illustrated in FIG. 18 includes a name field 522 that can be used to provide a name for the rule being created, and a description field 524 that can used to provide a description for the rule. This example also includes a vehicle selection criteria section 526 that, in this example, includes age consideration criteria as well as mileage consideration criteria. In the example illustrated, the age criteria includes a field in which to enter an age range 528 and a number of years 530. For example, the age range may be greater than, less than, or equal to.

Likewise, in this example, the mileage criteria also includes a mileage range 536 and a mileage field 538. Thus, for example, the user can specify a mileage range greater than, less than or equal to a certain number of miles. Additionally, a Boolean operator 532 can be included to make the age and mileage criteria Boolean functions such as, for example, AND or OR functions.

The example interface illustrated in FIG. 18 also includes part selection criteria 542. In this section of the interface, the user can specify in field 544 one or more parts to which the rule will apply, and a type of parts specification field. In this example, the parts are specified using provided checkboxes. In this illustrated example, there are four checkboxes 546 that can be used for identifying a criteria for the selected parts. The examples in this illustration include original equipment (OE), remanufactured (RM), like kind (LK), and after market (AM). A button 545 can be included for selection by the user to allow the user to select the part or parts to which the rule will apply. For example, clicking button 545 can pull up a window through which the appropriate parts can be selected.

Although not illustrated in FIG. 18, the option can also be provided to allow the user to specify whether betterment or depreciation applies. This can be provided, for example, in place of or in addition to the part-type definition input 546. Thus, for example, a check box or other indicator can be provided to allow the user to specify whether betterment or depreciation applies to the identified part or parts (or to all parts for the identified vehicles). In another embodiment, an alternative window can be provided to allow the user to specify a rule for whether the remedial action is to consider betterment or depreciation.

As discussed above, in one embodiment various criteria can be selected as either inclusive criteria or criteria to identify a category to be excluded. In the example illustrated in FIG. 18, the opportunity for the rule creator to exclude vehicle criteria is provided in vehicle exclusion criteria field 548. In one embodiment, the user interface can be implemented such that criteria can be identified, and selection made as to whether that criteria is meant to be inclusive or to identify a criteria to be excluded from application of the rule. In this case, this example provides a field to enter a category of vehicles that will be excluded.

For example, a rule creator may decide that the particular rule being created would not apply to a particular make and model of vehicle or a particular class, type, duty, or other criteria of vehicle as the rules creator may deem appropriate. In a preferred embodiment, the exclusion criteria allows the rule creator to identify a make or make and model of vehicle to be excluded from the rule. Selection button 549 can be clicked to open criteria selections for identifying the exclusion criteria. Selection button 549 might open a selection box allowing the category to be selected before advancing to the list of vehicles in that category. Alternatively, selection button 549 might be implemented go directly to a list of vehicles for a predetermined category. For example, in the case of make/model exclusions, clicking button 549 would open a window to allow the user to select the make and model of vehicle to exclude from the rule.

As discussed above with the example provided in FIG. 11, a non-compliance message field 550 can be included to allow the user to enter a non-compliance message to be used when an estimate is generated with a non-compliant item. Also, a required checkbox 552 can be used to allow the creator to determine or specify whether the rule is a required rule or not. Save and cancel buttons 554 and 556 allow the user to save the rule or to cancel the creation.

As discussed above, selection button 545 allows a user to identify the part or parts to which the rule will apply. In one embodiment, clicking selection 545 opens a new window in which the part or parts can be identified. FIG. 19 is a diagram illustrating an example parts selection window that can be accessed by clicking button 545. Another example of a parts selection window is that illustrated and discussed above with respect to FIG. 13. Although not illustrated, the parts selections window can include sort and search functions to facilitate searching for particular parts or for assemblies and sub-assemblies. Once one or more parts or groups of parts have been selected, the user can click the Add Selected Parts to Rule button 558 to add this selection to the rule being created or the user can cancel out with Cancel button 560.

FIGS. 20 and 21 illustrate an example user interface for a make/model selection in accordance with one embodiment of the invention. As discussed above with reference to FIG. 18, in that example illustration a button 549 can be used to allow the user to select make and model criteria (or other criteria, depending on the application) for inclusion in field 548. FIGS. 20 and 21 are an example of the interface that can be utilized to facilitate make and model selection. FIG. 20 illustrates an example listing of vehicle makes that can be provided in a drop down menu 572. In this illustrated example, an alphabetical listing of vehicle makes is provided to allow the user to scroll and select the particular make to which the rule will apply. Similarly, FIG. 21 illustrates the drop down menu 574 that can be used to illustrate the various models that can be identified.

Particularly, in the example illustrated in FIG. 20 when a vehicle make BMW is selected, the interface is configured such that models manufactured by BMW appear in the drop down list. Allowing model selection by first selecting make in this hierarchical fashion may allow for easier access to model identification. In the illustrated example, the 525 is the selected model. Thus, if the add button 576 is clicked, the make and model BMW 525 would be added to the exclusion criteria field in FIG. 18. In one embodiment, multiple makes and models can be added either one at a time, or by utilizing the control key or the shift key to select multiple items in one selection. Additionally, in one embodiment, the model specification can be left blank such that every model of a selected make or makes is included in the selected criteria.

In the illustrated embodiment, a model-by-model listing is provided for the selected make. In alternative embodiments, model categories may also be provided to facilitate multiple-model selection without identifying each individual item. For example, model selection criteria might be provided that allowed the user to select all coupes, sedans, all-wheel drives, or SUVs for example, or all models having the V6, V8 or V12 engine as an other example. As yet a further example, the interface can be implemented to provide the user the ability to select model series such as, in the illustrated example of a BMW, to select the 5 series, the 7 series, M model series, and so on.

FIG. 22 is a diagram illustrating an example user interface such as that provided in FIG. 18, with example rule criteria provided. Thus, in this example, the rule is named "bumper rule" and it has the description "check for non-OE bumper parts." The vehicle criteria specifies that if the vehicle age is more than two years old or the mileage is more than 12,000 miles, the rule will apply. The parts selection criteria specifies that bumper cover parts should be remanufactured, like kind or aftermarket. In this example, there are no vehicle exclusion criteria so the rule would apply to all vehicles that meet the specified criteria of being more than two years old or having more than 12,000 miles. The user has entered a non-compliance message stating "please consider recycled, AM or remanufactured bumper parts" and has not checked the "required" box meaning that the rule is or can be considered a guideline rather than a hard fast requirement.

Thus, in this example, in an estimate is created for a vehicle that is either more than two years old or has more than 12,000 miles and bumper cover parts are used in the estimate, if those parts are not either remanufactured, like kind, or after market, a non-compliance flag will be raised and the non-compliance message specified will be provided to the estimate preparer.

Yet another example of a user interface that can be used for rule creation is provided in FIG. 23 in accordance with one embodiment of the invention. This example interface is similar to the example illustrated in FIG. 11, however it has a slightly different layout of the entry fields. Additionally, instead of a drop down menu for part type 253 as shown in FIG. 11, the example illustrated in FIG. 23 includes checkboxes for original equipment, like kind, after market, or remanufactured. Note that the examples illustrated in FIGS. 11 and 23 include a field for the estimating system profile name. In such an example, a name for the rule can be given to aid in classifying the rule for various profiles that may be created utilizing one or more rules.

FIG. 24 is a diagram illustrating another example of a user interface that can be used to select make and model information. In this example the selection is for make and model exclusions. This listing is similar to that shown for parts selection in FIGS. 13 and 19, but is used for vehicle selection. Using the checkboxes, and directory boxes, a user can select one or more vehicles for exclusion. This can be a hierarchical set-up allowing the user to drill down into various "folders" of vehicle information. For example, in keeping with the above example, the user may wish to specify a BMW 525 as an exclusion. Thus, the user may open the BMW folder, thereby revealing the models, or next layer of folders, and be presented with a list of items for additional items or both to enable further drilling down in the hierarchy. For example, folders for vehicle types such as sedan, couple, convertible, etc. might be included as might folders for a series such as 5 series, 3 series, 7 series, M series, and so on, or individual models such as 525, 528, 530, 535 and so on. Thus any hierarchical configuration can be presented to enable the user to select a make a group of vehicles within a make or a particular model of a make.

As these additional examples illustrate there are a number of different configurations for the user interface that can be provided to enable a user-friendly approach to rules creation. After reading this description, one of ordinary skill in the art would understand how alternative interfaces can be provided to enable creation of rules and provide the features and functionality discussed herein.

As used herein, the term "module" is used to describe a given unit of functionality that can be performed in accordance with one or more embodiments of the present invention. As used herein, a module can be implemented utilizing any form of hardware, software, or a combination thereof. In implementation, the various modules described herein can be implemented as discrete modules or the functions and features described can be shared in part or in total among one or more modules. In other words, as would be apparent to one of ordinary skill in the art after reading this description, the various features and functionality described herein may be implemented in any given application can be implemented in one or more separate or shared modules in various combinations and permutations. The term tool can be used to refer to any apparatus configured to perform a recited function. Tools can include a collection of one or more modules and can also be comprised of hardware, software or a combination thereof. Thus, for example, a tool can be a collection of software modules, hardware modules, software/hardware modules or any combination or permutation thereof. As another example, a tool can be a computing device or other appliance on which software runs or in which hardware is implemented.

Where components or modules of the invention are implemented in whole or in part using software, in one embodiment, these elements can be implemented using a computing system capable of carrying out the functionality described with respect thereto. One such example computing system is shown in FIG. 25. Various embodiments are described in terms of this example computing system 600. After reading this description, it will become apparent to a person skilled in the relevant art how to implement the invention using other computing systems or architectures.

Referring now to FIG. 25, computing system 600 may represent, for example, desktop, laptop and notebook computers; hand-held computing devices (PDA's, cell phones, palmtops, etc.); mainframes, supercomputers, or servers; or any other type of special or general purpose computing devices as may be desirable or appropriate for a given application or environment. Computing system 600 can include one or more processors, such as a processor 604. Processor 604 can be implemented using a general or special purpose processing engine such as, for example, a microprocessor, controller or other control logic. In the example illustrated in FIG. 25, processor 604 is connected to a bus 602 or other communication medium.

Computing system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Computing system 600 can likewise includes a read only memory ("ROM") or other static storage device coupled to bus 602 for storing static information and instructions for processor 604.

The computing system 600 can also include information storage mechanism 610, which can include, for example, a media drive 612 and a removable storage interface 620. The media drive 612 can include a drive or other mechanism to support fixed or removable storage media. For example, a hard disk drive a floppy disk drive, a magnetic tape drive, an optical disk drive, a CD or DVD drive (R or RW), or other removable or fixed media drive. Storage media 618, can include, for example, a hard disk, a floppy disk, magnetic tape, optical disk, a CD or DVD, or other fixed or removable medium that is read by and written to by media drive 614. As these examples illustrate, the storage media 618 can include a computer usable storage medium having stored therein particular computer software or data.

In alternative embodiments, information storage mechanism 610 may include other similar instrumentalities for allowing computer programs or other instructions or data to be loaded into computing system 600. Such instrumentalities can include, for example, a removable storage unit 622 and an interface 620. Examples of such can include a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 can carry signals and can be implemented using a wireless medium, wire or cable, fiber optics, or other communications medium. Some examples of a channel can include a phone line, a cellular phone link, an RF link, a network interface, a local or wide area network, and other communications channels.

In this document, the terms "computer program medium" and "computer usable medium" are used to generally refer to media such as, for example, memory 608, storage device 618, a hard disk installed in hard disk drive 612, and signals on channel 628. These and other various forms of computer usable media may be involved in carrying one or more sequences of one or more instructions to processor 604 for execution. Such instructions, generally referred to as "computer program code" (which may be grouped in the form of computer programs or other groupings), when executed, enable the computing system 600 to perform features or functions of the present invention as discussed herein.

In an embodiment where the elements are implemented using software, the software may be stored in a computer program medium and loaded into computing system 600 using removable storage drive 614, hard drive 612 or communications interface 624. The computer program logic (in this example, software instructions or computer program code), when executed by the processor 604, causes the processor 604 to perform the functions of the invention as described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. An estimate compliance system to specify estimate compliance criteria for a vehicle repair estimate, comprising:
   a processor;
   a memory connected to the processor; and
   a non-transitory computer readable medium having instructions embedded therein, the instructions configured to implement the functionality of:
   accepting user input specifying vehicle criteria;
   accepting user input specifying parts criteria; and
   creating an estimate compliance rule, wherein the estimate compliance rule defines a third party payor estimate compliance criterion specifying a third party payor requirement and specifying parts criteria for a type of vehicle remedial activity based on the vehicle criteria, and wherein the third party payor requirement is configured to be compared against the type of vehicle remedial activity.

2. The system of claim 1, wherein the instructions are further configured to present the user with predefined vehicle criteria from which the user input can be selected.

3. The system of claim 1, wherein the instructions are further configured to present the user with predefined parts criteria from which the user input can be selected.

4. The system of claim 1, wherein the instructions are further configured to create a rules profile comprising a plurality of estimate compliance rules.

5. The system of claim 1, wherein the instructions are further configured to check a plurality of estimate compliance rules for conflicting rule criteria.

6. The system of claim 1, wherein the instructions are further configured to provide the estimate compliance rule to a remediation facility.

7. The system of claim 1, wherein the vehicle criteria comprises vehicle year or vehicle mileage.

8. The system of claim 1, wherein the instructions are configured to further accept a criteria range.

9. The system of claim 1, wherein the vehicle criteria comprises a vehicle class, vehicle make/model, vehicle type, or vehicle duty.

10. The system of claim 1, wherein the instructions are further configured to accept user input of a Boolean operator.

11. The system of claim 1, wherein the parts criteria comprises identification of a part, component, assembly, subassembly or category of parts.

12. The system of claim 1, wherein the parts criteria comprises a specification of part type.

13. The system of claim 1, wherein the instructions are further configured to accept user input specifying a non-compliance message.

14. The system of claim 1, wherein the instructions are further configured to accept user input to specify whether an identified criteria is excluded from or included in the estimate rule.

15. The system of claim 1, wherein the estimate compliance rule relates to a reimbursement amount, a deducible, a discount, a part, a material, labor, a tax, a vehicle, an incident, invoicing, an inspection, a supplier, a facility, or required information for estimate.

16. A computer program product comprising a computer useable storage medium having computer program stored therein for enabling a computer system to specify compliance criteria for a vehicle repair estimate by performing the functions of:
   enabling the computer to accept user input specifying vehicle criteria;
   enabling the computer to accept user input specifying parts criteria;
   enabling the computer to create an estimate compliance rule, wherein the estimate compliance rule defines a third party payor estimate compliance criterion specifying a third party payor requirement and specifying parts criteria for a type of vehicle remedial activity based on the vehicle criteria, and wherein the third party payor requirement is configured to be compared against the type of vehicle remedial activity.

17. The computer program product of claim 16, wherein the computer program logic further comprises computer readable program code for enabling the computer to present the user with predefined vehicle criteria from which the user input can be selected.

18. The computer program product of claim 16, wherein the computer program logic further comprises computer readable program code for enabling the computer to present the user with predefined parts criteria from which the user input can be selected.

19. The computer program product of claim 16, wherein the computer program logic further comprises medium computer readable program code for enabling the computer to create a rules profile comprising a plurality of estimate compliance rules.

20. The computer program product of claim 16, wherein the computer program logic further comprises medium computer readable program code for enabling the computer to check the plurality of estimate compliance rules for conflicting rule criteria.

21. The computer program product of claim 16, wherein the computer program logic further comprises medium computer readable program code for enabling the computer to provide the estimate compliance rule to a remediation facility.

22. The computer program product of claim 16, wherein the vehicle criteria comprises vehicle year or vehicle mileage.

23. The computer program product of claim 16, wherein at least one of the first and second computer readable program code further comprises program code for enabling the computer to at further accept a criteria range.

24. The computer program product of claim 16, wherein the vehicle criteria further comprises a vehicle mileage condition configured to accept user input to specify a range of applicable mileage.

25. The computer program product of claim 16, wherein the vehicle criteria comprises a vehicle class, vehicle make/model, vehicle type or vehicle duty.

26. The computer program product of claim 16, wherein the first computer readable program code further comprises computer readable program code for enabling the computer to accept user input of a Boolean operator.

27. The computer program product of claim 16, wherein the parts criteria comprises identification of a part, component, assembly, subassembly or category of parts.

28. The computer program product of claim 16, wherein the parts criteria comprises a specification of part type.

29. The computer program product of claim 16, wherein the computer program logic further comprises medium computer readable program code for enabling the computer to accept user input specifying a non-compliance message.

30. The computer program product of claim 16, wherein the computer program logic further comprises medium computer readable program code for enabling the computer to accept user input to specify whether an identified criteria is excluded from or included in the estimate rule.

31. The computer program product of claim 16, wherein the estimate compliance rule relates to a reimbursement amount, a deducible, a discount, apart, a material, labor, a tax, a vehicle, an incident, invoicing, an inspection, a supplier, a facility, or required information for estimate.

32. An estimate compliance method, operating on a computer, for specifying estimate compliance criteria for a vehicle repair estimate, comprising the steps of:

prompting a user for inputting vehicle criteria and parts criteria;

accepting vehicle criteria and parts criteria selected by the user;

creating an estimate compliance rule, wherein the estimate compliance rule defines a third party payor estimate compliance criterion specifying a third party payor requirement and specifying parts criteria for a type of vehicle remedial activity based on the vehicle criteria, and wherein the third party payor requirement is configured to be compared against the type of vehicle remedial activity; and sending the estimate compliance rule to a remediation facility.

33. The method of claim 32, further comprising the step of creating a rules profile comprised of a plurality of estimate compliance rules.

34. The method of claim 32, further comprising the step of checking the estimate compliance rule for conflicting rule criteria.

35. The method of claim 32, wherein the estimate compliance rule relates to a reimbursement amount, a deducible, a discount, apart, a material, labor, a tax, a vehicle, an incident, invoicing, an inspection, a supplier, a facility, or required information for estimate.

* * * * *